US009886316B2

(12) United States Patent
Belady et al.

(10) Patent No.: US 9,886,316 B2
(45) Date of Patent: Feb. 6, 2018

(54) DATA CENTER SYSTEM THAT ACCOMMODATES EPISODIC COMPUTATION

(71) Applicant: Microsoft Corporation, Redmond, WA (US)

(72) Inventors: Christian L. Belady, Mercer Island, WA (US); James R. Larus, Mercer Island, WA (US); Danny A. Reed, Redmond, WA (US); Christian H. Borgs, Boston, MA (US); Jennifer Tour Chayes, Boston, MA (US); Ilan Lobel, New York, NY (US); Ishai Menache, Cambridge, MA (US); Hamid Nazerzadeh, Cambridge, MA (US); Navendu Jain, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 430 days.

(21) Appl. No.: 14/464,650

(22) Filed: Aug. 20, 2014

(65) Prior Publication Data
US 2014/0365402 A1 Dec. 11, 2014

Related U.S. Application Data

(62) Division of application No. 12/913,763, filed on Oct. 28, 2010, now Pat. No. 8,849,469.

(51) Int. Cl.
*G06F 9/00* (2006.01)
*G06F 9/50* (2006.01)
(Continued)

(52) U.S. Cl.
CPC .......... *G06F 9/5027* (2013.01); *G06F 1/3203* (2013.01); *G06F 1/329* (2013.01);
(Continued)

(58) Field of Classification Search
None
See application file for complete search history.

(56) References Cited

U.S. PATENT DOCUMENTS 5,576,700 A  11/1996 Davis et al.
5,644,247 A   7/1997 Hyun et al.
(Continued)

FOREIGN PATENT DOCUMENTS

CN    1510570 A    7/2004
CN  101088072 A   12/2007
(Continued)

OTHER PUBLICATIONS

Response filed Jun. 27, 2012 to Requirement for Restriction Election dated Jun. 7, 2012 from U.S. Appl. No. 12/913,763, 10 pages.
(Continued)

*Primary Examiner* — Gurkanwaljit Singh
(74) *Attorney, Agent, or Firm* — Rainier Patents, P.S.

(57) ABSTRACT

A data center system is described which includes multiple data centers powered by multiple power sources, including any combination of renewable power sources and on-grid utility power sources. The data center system also includes a management system for managing execution of computational tasks by moving data components associated with the computational tasks within the data center system, in lieu of, or in addition to, moving power itself. The movement of data components can involve performing pre-computation or delayed computation on data components within any data center, as well as moving data components between data centers. The management system also includes a price determination module for determining prices for performing the computational tasks based on different pricing models.

(Continued)

The data center system also includes a "stripped down" architecture to complement its use in the above-summarized data-centric environment.

20 Claims, 13 Drawing Sheets

(51) Int. Cl.
| | | |
|---|---|---|
| *G06F 1/32* | (2006.01) | |
| *H04L 29/08* | (2006.01) | |
| *G06Q 10/06* | (2012.01) | |
| *G06Q 30/02* | (2012.01) | |
| *G06Q 30/04* | (2012.01) | |
| *G06Q 40/04* | (2012.01) | |
| *G06Q 50/06* | (2012.01) | |
| *H02J 3/00* | (2006.01) | |
| *H04L 12/701* | (2013.01) | |

(52) U.S. Cl.
CPC ............ *G06F 9/505* (2013.01); *G06F 9/5094* (2013.01); *G06Q 10/06312* (2013.01); *G06Q 10/06315* (2013.01); *G06Q 30/0283* (2013.01); *G06Q 30/04* (2013.01); *G06Q 40/04* (2013.01); *G06Q 50/06* (2013.01); *H02J 3/008* (2013.01); *H04L 67/1004* (2013.01); *H04L 45/00* (2013.01); *Y02B 60/142* (2013.01); *Y02P 90/82* (2015.11); *Y02P 90/90* (2015.11); *Y04S 10/58* (2013.01); *Y04S 50/12* (2013.01); *Y04S 50/14* (2013.01)

(56) References Cited

U.S. PATENT DOCUMENTS

| | | | |
|---|---|---|---|
| 5,742,103 | A | 4/1998 | Ashok |
| 6,263,315 | B1 | 7/2001 | Talluri |
| 6,452,289 | B1 | 9/2002 | Lansberry |
| 6,795,928 | B2 | 9/2004 | Bradley et al. |
| 6,868,682 | B2 | 3/2005 | Sharma et al. |
| 7,110,913 | B2 | 9/2006 | Monroe et al. |
| 7,111,061 | B2 | 9/2006 | Leighton et al. |
| 7,122,913 | B2 | 10/2006 | Witten et al. |
| 7,127,625 | B2 | 10/2006 | Farkas et al. |
| 7,134,011 | B2 | 11/2006 | Fung |
| 7,135,956 | B2 | 11/2006 | Bartone et al. |
| 7,136,830 | B1 | 11/2006 | Kuelbs et al. |
| 7,149,605 | B2 | 12/2006 | Chassin et al. |
| 7,272,735 | B2 | 9/2007 | Fung |
| 7,318,154 | B2 | 1/2008 | Tehee |
| 7,321,221 | B2 | 1/2008 | Bucker et al. |
| 7,350,186 | B2 | 3/2008 | Coleman et al. |
| 7,365,973 | B2 | 4/2008 | Rasmussen et al. |
| 7,373,268 | B1 | 5/2008 | Viredaz et al. |
| 7,379,884 | B2 | 5/2008 | Barsness |
| 7,430,459 | B1 | 9/2008 | Papalia et al. |
| 7,437,730 | B2 | 10/2008 | Goyal |
| 7,484,111 | B2 | 1/2009 | Fung |
| 7,500,001 | B2 | 3/2009 | Tameshige et al. |
| 7,525,207 | B2 | 4/2009 | Clidaras |
| 7,551,130 | B2 | 6/2009 | Altenschulte |
| 7,552,345 | B2 | 6/2009 | Chang et al. |
| 7,560,823 | B2 | 7/2009 | Schellings |
| 7,568,360 | B1 | 8/2009 | Bash et al. |
| 7,604,535 | B2 | 10/2009 | Germagian et al. |
| 7,606,719 | B2 | 10/2009 | Barsness |
| 7,608,937 | B1 | 10/2009 | Altenschulte |
| 7,711,587 | B2 | 5/2010 | De Marcken |
| 7,752,858 | B2 | 7/2010 | Johnson et al. |
| 7,797,563 | B1 | 9/2010 | Moll |
| 7,820,321 | B2 | 10/2010 | Horne |
| 7,844,370 | B2 | 11/2010 | Pollack et al. |
| 7,881,057 | B2 | 2/2011 | Fink |
| 7,903,407 | B2 | 3/2011 | Matsushima et al. |
| 7,923,965 | B2 | 4/2011 | Ritter |
| 7,961,463 | B2 | 6/2011 | Belady et al. |
| 8,041,967 | B2 | 10/2011 | Belady et al. |
| 8,080,898 | B2 | 12/2011 | Fukuhara |
| 8,080,900 | B2 | 12/2011 | Corhodzic |
| 8,082,454 | B2 | 12/2011 | Totten |
| 8,145,731 | B2 | 3/2012 | Cherkasova et al. |
| 8,164,897 | B2 | 4/2012 | Graybill |
| 8,174,225 | B2 | 5/2012 | Mazumdar et al. |
| 8,189,561 | B2 | 5/2012 | Karaoguz et al. |
| 8,225,119 | B2 | 7/2012 | Jain |
| 8,258,761 | B2 | 9/2012 | Hammerstrom |
| 8,271,807 | B2 | 9/2012 | Jackson |
| 8,332,666 | B2 | 12/2012 | Boss et al. |
| 8,333,316 | B2 | 12/2012 | Heath et al. |
| 8,359,125 | B2 | 1/2013 | Park |
| 8,364,322 | B2 | 1/2013 | Oury et al. |
| 8,370,652 | B2 | 2/2013 | Liu et al. |
| 8,401,709 | B2 | 3/2013 | Cherian et al. |
| 8,458,011 | B2 | 6/2013 | Al-Dawsari et al. |
| 8,588,989 | B1 | 11/2013 | Brooks et al. |
| 8,595,515 | B1 | 11/2013 | Weber et al. |
| 8,645,722 | B1 | 2/2014 | Weber et al. |
| 8,650,420 | B2 | 2/2014 | Kato et al. |
| 8,839,254 | B2 | 9/2014 | Horvitz et al. |
| 8,849,469 | B2 | 9/2014 | Belady et al. |
| 9,063,738 | B2 | 6/2015 | Jain et al. |
| 9,207,993 | B2 | 12/2015 | Jain |
| 9,450,838 | B2 | 9/2016 | Jain et al. |
| 9,519,878 | B2 | 12/2016 | Sankar et al. |
| 2002/0004913 | A1 | 1/2002 | Fung |
| 2002/0041126 | A1 | 4/2002 | Provanzana et al. |
| 2002/0152305 | A1 | 10/2002 | Jackson et al. |
| 2003/0079151 | A1 | 4/2003 | Bohrer |
| 2003/0101263 | A1 | 5/2003 | Bouillet et al. |
| 2003/0115495 | A1 | 6/2003 | Rawson, III |
| 2003/0193777 | A1 | 10/2003 | Friedrich et al. |
| 2003/0196126 | A1 | 10/2003 | Fung |
| 2004/0078153 | A1 | 4/2004 | Bartone et al. |
| 2004/0177057 | A1 | 9/2004 | Fairchild et al. |
| 2004/0236846 | A1 | 11/2004 | Alvarez et al. |
| 2004/0267897 | A1 | 12/2004 | Hill et al. |
| 2005/0132051 | A1 | 6/2005 | Hill |
| 2005/0190912 | A1 | 9/2005 | Hopkins et al. |
| 2005/0193113 | A1 | 9/2005 | Kokusho |
| 2005/0241810 | A1 | 11/2005 | Malone et al. |
| 2005/0256952 | A1 | 11/2005 | Mouhanna et al. |
| 2006/0017328 | A1 | 1/2006 | Bryde |
| 2006/0017809 | A1* | 1/2006 | Carroll ............ G08B 13/19621 348/158 |
| 2006/0036878 | A1 | 2/2006 | Rothman |
| 2006/0041537 | A1 | 2/2006 | Ahmed |
| 2006/0044117 | A1 | 3/2006 | Farkas et al. |
| 2006/0080213 | A1 | 4/2006 | Inoue |
| 2006/0184287 | A1* | 8/2006 | Belady ................ G06F 1/3203 700/291 |
| 2006/0276938 | A1 | 12/2006 | Miller |
| 2006/0277109 | A1 | 12/2006 | Kerth et al. |
| 2007/0010914 | A1 | 1/2007 | Johnson et al. |
| 2007/0049133 | A1 | 3/2007 | Conroy |
| 2007/0097636 | A1 | 5/2007 | Johnson et al. |
| 2007/0130341 | A1 | 6/2007 | Ma |
| 2007/0136392 | A1 | 6/2007 | Oh et al. |
| 2007/0250838 | A1 | 10/2007 | Belady et al. |
| 2007/0294408 | A1 | 12/2007 | Jackson |
| 2008/0028246 | A1 | 1/2008 | Witham |
| 2008/0030078 | A1 | 2/2008 | Whiffed |
| 2008/0049714 | A1 | 2/2008 | Commarford et al. |
| 2008/0072090 | A1 | 3/2008 | O'Connor |
| 2008/0141048 | A1 | 6/2008 | Palmer |
| 2008/0201720 | A1 | 8/2008 | Betzler |
| 2008/0234873 | A1 | 9/2008 | Gorbatov et al. |
| 2008/0255899 | A1* | 10/2008 | McConnell ............ G06Q 10/06 705/7.37 |
| 2008/0313101 | A1 | 12/2008 | Helander et al. |
| 2008/0316938 | A1 | 12/2008 | Shi |
| 2009/0063122 | A1 | 3/2009 | Nasle |
| 2009/0070611 | A1 | 3/2009 | Bower, III et al. |
| 2009/0106571 | A1 | 4/2009 | Low et al. |

(56) References Cited

U.S. PATENT DOCUMENTS

| | | |
|---|---|---|
| 2009/0119233 A1 | 5/2009 | Dunagan et al. |
| 2009/0119523 A1 | 5/2009 | Totten |
| 2009/0146815 A1 | 6/2009 | Cho |
| 2009/0201293 A1 | 8/2009 | Tung et al. |
| 2009/0215375 A1 | 8/2009 | Hagensen |
| 2009/0228726 A1* | 9/2009 | Malik .................. G06F 1/3203 713/320 |
| 2009/0229194 A1 | 9/2009 | Armillas |
| 2009/0235097 A1 | 9/2009 | Hamilton et al. |
| 2009/0248854 A1* | 10/2009 | Conway ............... G06F 1/3203 709/224 |
| 2009/0251860 A1 | 10/2009 | Belady et al. |
| 2009/0254660 A1 | 10/2009 | Hanson |
| 2009/0265568 A1 | 10/2009 | Jackson |
| 2009/0265704 A1 | 10/2009 | Branda et al. |
| 2009/0271046 A1 | 10/2009 | Lewis |
| 2009/0276771 A1 | 11/2009 | Nickolov et al. |
| 2009/0279444 A1 | 11/2009 | Ravindran et al. |
| 2009/0281674 A1 | 11/2009 | Taft |
| 2009/0281846 A1* | 11/2009 | Rose ...................... G06Q 10/06 705/7.39 |
| 2009/0295167 A1 | 12/2009 | Clidaras |
| 2009/0319090 A1* | 12/2009 | Dillon ................... G06Q 10/04 700/291 |
| 2010/0003545 A1 | 1/2010 | Horne et al. |
| 2010/0017045 A1 | 1/2010 | Nesler et al. |
| 2010/0020806 A1 | 1/2010 | Vandat et al. |
| 2010/0037038 A1 | 2/2010 | Bieswanger |
| 2010/0049616 A1 | 2/2010 | Hipsher |
| 2010/0050172 A1 | 2/2010 | Ferris |
| 2010/0057641 A1 | 3/2010 | Boss |
| 2010/0058350 A1 | 3/2010 | Boss |
| 2010/0060079 A1 | 3/2010 | MacLellan et al. |
| 2010/0061250 A1 | 3/2010 | Nugent et al. |
| 2010/0076615 A1* | 3/2010 | Daniel ...................... F03D 9/00 700/293 |
| 2010/0088150 A1 | 4/2010 | Mazhar et al. |
| 2010/0088205 A1 | 4/2010 | Robertson |
| 2010/0100696 A1 | 4/2010 | Suzuki |
| 2010/0145801 A1 | 6/2010 | Chekuri |
| 2010/0191998 A1* | 7/2010 | Moore ................... G06Q 10/06 713/340 |
| 2010/0211669 A1* | 8/2010 | Dalgas ................... G06F 9/5027 709/224 |
| 2010/0218005 A1 | 8/2010 | Jain |
| 2010/0218186 A1 | 8/2010 | Wolfe et al. |
| 2010/0228819 A1 | 9/2010 | Wei |
| 2010/0235903 A1 | 9/2010 | Carter et al. |
| 2010/0248609 A1 | 9/2010 | Tresh et al. |
| 2010/0250358 A1 | 9/2010 | Elkins, II et al. |
| 2010/0306776 A1 | 12/2010 | Greene |
| 2010/0313203 A1 | 12/2010 | Dawson et al. |
| 2010/0314942 A1 | 12/2010 | Talkin et al. |
| 2010/0318454 A1 | 12/2010 | Warncke et al. |
| 2010/0319004 A1 | 12/2010 | Hudson |
| 2010/0332373 A1 | 12/2010 | Crabtree et al. |
| 2010/0332401 A1 | 12/2010 | Prahlad et al. |
| 2010/0333105 A1 | 12/2010 | Horvitz et al. |
| 2010/0333116 A1 | 12/2010 | Prahlad |
| 2011/0016214 A1 | 1/2011 | Jackson |
| 2011/0018342 A1 | 1/2011 | Park et al. |
| 2011/0035072 A1 | 2/2011 | Jackson |
| 2011/0055034 A1 | 3/2011 | Ferris et al. |
| 2011/0077795 A1* | 3/2011 | VanGilder ............... G06F 1/206 700/300 |
| 2011/0099095 A1* | 4/2011 | Moore .................. G06Q 10/063 705/30 |
| 2011/0105015 A1 | 5/2011 | Carlson |
| 2011/0106321 A1 | 5/2011 | Cherian et al. |
| 2011/0115641 A1 | 5/2011 | Hidalgo Rodrigo |
| 2011/0131309 A1 | 6/2011 | Akiyama |
| 2011/0138708 A1 | 6/2011 | Chazelle et al. |
| 2011/0161526 A1 | 6/2011 | Ravindran |
| 2011/0173465 A1 | 7/2011 | Akers et al. |
| 2011/0205949 A1 | 8/2011 | Maenpaa et al. |
| 2011/0208606 A1 | 8/2011 | Hadar |
| 2011/0231552 A1 | 9/2011 | Carter et al. |
| 2011/0240265 A1 | 10/2011 | Dechene |
| 2011/0271283 A1 | 11/2011 | Bell, Jr. et al. |
| 2011/0276192 A1 | 11/2011 | Ropp |
| 2011/0276194 A1 | 11/2011 | Emalfarb et al. |
| 2011/0278928 A1 | 11/2011 | Burger et al. |
| 2011/0282982 A1 | 11/2011 | Jain |
| 2011/0288898 A1 | 11/2011 | Roe |
| 2011/0296019 A1 | 12/2011 | Ferris |
| 2012/0016721 A1 | 1/2012 | Weinman |
| 2012/0030356 A1 | 2/2012 | Fletcher |
| 2012/0032631 A1 | 2/2012 | Bourilkov et al. |
| 2012/0053925 A1 | 3/2012 | Geffin et al. |
| 2012/0059532 A1 | 3/2012 | Reifenhauser et al. |
| 2012/0065805 A1 | 3/2012 | Montalvo |
| 2012/0066519 A1 | 3/2012 | Ei-Essawy et al. |
| 2012/0089726 A1 | 4/2012 | Doddavula |
| 2012/0095940 A1 | 4/2012 | Borgs et al. |
| 2012/0101639 A1 | 4/2012 | Carralero et al. |
| 2012/0109705 A1 | 5/2012 | Belady |
| 2012/0115433 A1 | 5/2012 | Young |
| 2012/0130554 A1 | 5/2012 | Jain et al. |
| 2012/0158447 A1 | 6/2012 | Jain et al. |
| 2012/0181853 A1 | 7/2012 | Plese |
| 2012/0217821 A1 | 8/2012 | Bin Jamlus et al. |
| 2012/0245744 A1 | 9/2012 | Prosser et al. |
| 2012/0259760 A1 | 10/2012 | Sgouridis et al. |
| 2012/0278503 A1 | 11/2012 | DeCusatis et al. |
| 2012/0290725 A1 | 11/2012 | Podila |
| 2012/0323398 A1 | 12/2012 | Boss et al. |
| 2012/0330711 A1 | 12/2012 | Jain et al. |
| 2012/0331113 A1 | 12/2012 | Jain et al. |
| 2012/0331317 A1 | 12/2012 | Rogers et al. |
| 2013/0015713 A1 | 1/2013 | Hagihara |
| 2013/0041514 A1 | 2/2013 | Apalenek et al. |
| 2013/0054044 A1 | 2/2013 | Shaffer et al. |
| 2013/0063273 A1 | 3/2013 | Bhageria et al. |
| 2013/0086404 A1 | 4/2013 | Sankar et al. |
| 2013/0138482 A1 | 5/2013 | Anderson et al. |
| 2013/0162215 A1 | 6/2013 | Cooper |
| 2013/0179061 A1 | 7/2013 | Gadh et al. |
| 2013/0191052 A1 | 7/2013 | Fernandez et al. |
| 2013/0201316 A1 | 8/2013 | Binder et al. |
| 2013/0212410 A1 | 8/2013 | Li et al. |
| 2013/0232094 A1 | 9/2013 | Anderson et al. |
| 2013/0261817 A1 | 10/2013 | Detmers et al. |
| 2013/0274947 A1 | 10/2013 | Miller et al. |
| 2013/0318371 A1 | 11/2013 | Hormuth |
| 2013/0345888 A1 | 12/2013 | Forbes |
| 2014/0025220 A1 | 1/2014 | Carlson et al. |
| 2014/0039965 A1 | 2/2014 | Steven et al. |
| 2014/0075222 A1 | 3/2014 | Jackson |
| 2014/0142767 A1 | 5/2014 | Hjelm et al. |
| 2015/0015213 A1 | 1/2015 | Brooks et al. |
| 2016/0011575 A1 | 1/2016 | Liu et al. |
| 2016/0011607 A1 | 1/2016 | James et al. |
| 2016/0011616 A1 | 1/2016 | Janous et al. |
| 2016/0011617 A1 | 1/2016 | Liu et al. |
| 2016/0011618 A1 | 1/2016 | Janous et al. |
| 2016/0013647 A1 | 1/2016 | Liu et al. |
| 2016/0013652 A1 | 1/2016 | Li et al. |
| 2016/0013980 A1 | 1/2016 | McKnight et al. |
| 2016/0344595 A1 | 11/2016 | Jain et al. |

FOREIGN PATENT DOCUMENTS

| | | |
|---|---|---|
| CN | 100458605 C | 2/2009 |
| CN | 101430596 A | 5/2009 |
| CN | 101916415 A | 12/2010 |
| CN | 101096942 B | 3/2013 |
| EP | 2287991 A1 | 2/2011 |
| EP | 2511870 A1 | 10/2012 |
| EP | 2701261 A1 | 2/2014 |
| EP | 2701266 A1 | 2/2014 |
| JP | 2003-162591 | 6/2003 |
| JP | 2003324956 | 11/2003 |
| JP | 2006508445 | 3/2006 |

(56) References Cited

FOREIGN PATENT DOCUMENTS

| JP | 2007-249470 | | 9/2007 |
|---|---|---|---|
| JP | 2007-324956 | | 12/2007 |
| KR | 1020050084874 | A | 8/2005 |
| KR | 1020090120704 | | 11/2009 |
| WO | 2004/049157 | | 6/2004 |
| WO | 2004/092971 | A1 | 10/2004 |
| WO | 2004092971 | | 10/2004 |
| WO | 2009012451 | | 1/2009 |
| WO | 2010/010544 | | 1/2010 |

OTHER PUBLICATIONS

Non-Final Office Action dated Dec. 31, 2012 from U.S. Appl. No. 12/913,763, 15 pages.
Response filed Apr. 30, 2013 to Non-Final Office Action dated Dec. 31, 2012 from U.S. Appl. No. 12/913,763, 16 pages.
Notice of Allowance dated Aug. 23, 2013 from U.S. Appl. No. 12/913,763, 9 pages.
Non-Final Office Action dated Nov. 21, 2012 from U.S. Appl. No. 12/779,059, 24 pages.
Amendment/Response filed Feb. 15, 2013 to Non-Final Office Action dated Nov. 21, 2012 from U.S. Appl. No. 12/779,059, 9 pages.
Final Office Action dated Apr. 11, 2013 from U.S. Appl. No. 12/779,059, 31 pages.
Final Office Action dated Oct. 3, 2012 from U.S. Appl. No. 12/973,399, 25 pages.
Response filed Jan. 23, 2013 to Final Office Action dated Oct. 3, 2012 from U.S. Appl. No. 12/973,399, 16 pages.
Response filed Feb. 10, 2014 to Final Office Action dated Oct. 9, 2013 from U.S. Appl. No. 13/169,890, 17 pages.
Non-Final Office Action dated Mar. 27, 2014 from U.S. Appl. No. 13/169,890, 13 pages.
Response filed Jul. 24, 2014 to Non-Final Office Action dated Mar. 27, 2014 from U.S. Appl. No. 13/169,890, 18 pages.
Non-Final Office Action dated Nov. 14, 2014 from U.S. Appl. No. 13/169,890, 13 pages.
Final Office Action dated Jun. 5, 2015 from U.S. Appl. No. 13/169,890, 16 pages.
First Office Action dated Sep. 16, 2014 from China Application No. 201180024779.5, 12 pages.
Response filed Feb. 9, 2015 to Non-Final Office Action dated Oct. 6, 2014 from U.S. Appl. No. 13/169,923, 19 pages.
Restriction Election dated Feb. 28, 2013 from U.S. Appl. No. 13/169,890, 6 pages.
Response filed Mar. 18, 2013 to Restriction Election dated Feb. 28, 2013 from U.S. Appl. No. 13/169,890, 11 pages.
Non-Final Office Action dated Apr. 15, 2013 from U.S. Appl. No. 13/169,890, 10 pages.
Response filed Aug. 15, 2013 to Non-Final Office Action dated Apr. 15, 2013 from U.S. Appl. No. 13/169,890, 12 pages.
Final Office Action dated Oct. 9, 2013 from U.S. Appl. No. 13/169,890, 11 pages.
Response filed Feb. 17, 2015 to Non-Final Office Action dated Nov. 14, 2014 from U.S. Appl. No. 13/169,890, 19 pages.
Response filed Dec. 4, 2013 to First Office Action dated Jul. 29, 2013 for China Patent Application No. 201080009556.7, 15 pages.
Final Office Action dated Jul. 31, 2014 for China Patent Application No. 201080009556.7, 7 pages.
Decision on Reexamination dated Dec. 16, 2014 for China Patent Application No. 201080009556.7, 3 pages.
Third Office Action dated Dec. 31, 2014 for China Patent Application No. 201080009556.7, 7 pages.
Response filed Mar. 4, 2015 to Third Office Action dated Dec. 31, 2014 for China Patent Application No. 201080009556.7, 15 pages.
Examination Report dated Oct. 17, 2014 for European Patent Application No. 10744134.7, 7 pages.
Non-Final Office Action dated Dec. 3, 2013 from U.S. Appl. No. 12/781,445, 16 pages.
Response filed Apr. 1, 2014 to Non-Final Office Action dated Dec. 3, 2013 from U.S. Appl. No. 12/781,445, 12 pages.
Final Office Action dated May 5, 2014 from U.S. Appl. No. 12/781,445, 12 pages.
Response filed Sep. 15, 2014 to Final Office Action dated May 5, 2014 from U.S. Appl. No. 12/781,445, 10 pages.
Notice of Allowance dated Mar. 31, 2014 from U.S. Appl. No. 12/492,385, 5 pages.
Supplemental Amendment dated Jun. 6, 2014 from U.S. Appl. No. 12/492,385, 8 pages.
Notice of Allowance dated Jun. 24, 2014 from U.S. Appl. No. 12/492,385, 8 pages.
Notice of Allowance dated Jul. 30, 2014 from U.S. Appl. No. 12/492,385, 7 pages.
Final Office Action dated Feb. 5, 2014 from U.S. Appl. No. 12/903,227, 18 pages.
Response filed Apr. 6, 2015 to Non-Final Office Action dated Dec. 5, 2014 from U.S. Appl. No. 12/779,059, 13 pages.
Notice of Allowance dated May 20, 2015 from U.S. Appl. No. 12/779,059, 9 pages.
Notice of Allowance dated Apr. 13, 2015 for Chinese Application No. 201080009556.7, 7 pages.
Notice of Allowance dated Apr. 9, 2014 from U.S. Appl. No. 12/951,977, 12 pages.
Notice of Allowance dated May 21, 2014 from U.S. Appl. No. 12/951,977, 9 pages.
Notice of Allowance dated Sep. 5, 2014 from U.S. Appl. No. 12/951,977, 7 pages.
Notice of Allowance dated Jul. 7, 2014 from U.S. Appl. No. 12/913,763, 6 pages.
Notice of Allowance dated Aug. 15, 2014 from U.S. Appl. No. 12/913,763, 6 pages.
Amendment filed Jan. 30, 2013 from Chinese Patent Application No. 2011-551110, 7 pages.
Response filed Oct. 2, 2013 from Chinese Patent Application No. 2011-551110, 11 pages.
Request for Examination with Voluntary Amendment filed Dec. 30, 2014 from Korean Patent Application No. 10-2011-7019493, 17 pages.
Final Office Action dated Dec. 18, 2013 from U.S. Appl. No. 13/169,923, 11 pages.
Response filed Feb. 24, 2014 to Final Office Action dated Dec. 18, 2013 from U.S. Appl. No. 13/169,923, 18 pages.
Non-Final Office Action dated Oct. 6, 2014 from U.S. Appl. No. 13/169,923, 17 pages.
Final Office Action dated May 14, 2015 from U.S. Appl. No. 13/169,923, 17 pages.
Non-Final Office Action dated Apr. 3, 2013 from U.S. Appl. No. 12/781,445, 11 pages.
Response filed Aug. 2, 2013 to Non-Final Office Action dated Apr. 3, 2013 from U.S. Appl. No. 12/781,445, 14 pages.
Non-Final Office Action dated Sep. 23, 2014 from U.S. Appl. No. 12/781,445, 12 pages.
Buchbinder, et al., "The Design of Competitive Online Algorithms Via a Primal-dual Approach", Foundations and Trends in Theoretical Computer Science, vol. 3, Nos. 2-3, 2007, pp. 93-263, 174 pages.
Jain et al., "SLA-Integrated Pricing Models for Cloud Computing", Microsoft Research, Oct. 18, 2010, 5 pages.
Bansal et al., "Metrical Task Systems and the K-Server Problem on HSTs," Proceedings of the 37th International Conference on Automata, Languages, and Programming, 2010.
Kahn, "As Power Demand Soars, Grid Holds Up . . . So Far," Associated Press, Jul. 7, 2010.
Rao et al., "Minimizing Electricity Cost: Optimization of Distributed Internet Data Centers in a Multi-Electricity-Market Environment," Proceedings of the IEEE INFOCOMM, pp. 1-9, Mar. 14-19, 2010.
Vazirani, Vijay, Approximation Algorithms, Georgia Institute of Technology, College of Computing, Springer, 2001.
"Carbon Dioxide Emissions from the Generation of Electric Power in the United States," Retrieved From: <<http://www.eia.gov/cneaf/ electricity/page/co2_report/co2report.html>>, Jul. 2000.

(56) References Cited

OTHER PUBLICATIONS

Bansal et al., "A Primal-Dual Randomized Algorithm for Weighted Paging," Proceedings of the 48th Annual IEEE Symposium on Foundations of Computer Science, pp. 507-517, 2007.
Bansal et al., "Randomized Competitive Algorithms for Generalized Caching," Proceedings of the 40th Annual ACM Symposium on Theory of Computing, pp. 235-244, May 17-20, 2008.
Bansal et al., "Towards the Randomized K-Server Conjecture: A Primal-Dual Approach," Proceedings of the 21st Annual ACM-SIAM Symposium on Discreet Algorithms pp. 40-55, 2010.
Bartal et al., "A Polylog (N)-Competitive Algorithm for Metrical Task Systems," Proceedings of the 29th Annual ACM Symposium on Theory of Computing, pp. 711-719, 1997.
Belady, "In the Data Center, Power and Cooling Costs More Than the IT Equipment it Supports," Electronic Cooling, Feb. 1, 2007.
Borodin et al., "An Optimal On-Line Algorithm for Metrical Task System," Journal of the ACM, vol. 39, No. 4, pp. 745-763, Sep. 1992.
Harrison, Andrew, "Symantec Energy Efficient Data Center Solutions," Retrieved From: <<http://m.softchoice.com/files/pdf/about/sustain-enable/Symantec.energy_efficient_data_center_solutions.pdf>>, Symantec Corporation, Jan. 12, 2008.
Buchbinder et al., "The Design of Competitive Online Algorithms Via a Primal-Dual Approach," Foundations of Trends in Theoretical Computer Science, vol. 3, Issue 2-3, pp. 93-263, Feb. 2009.
Butler, "France Unveils Carbon Tax," Nature, Sep. 15, 2009.
Fiat et al., "Better Algorithms for Unfair Metrical Task Systems and Applications," Proceedings of the 32nd Annual ACM Symposium on Theory of Computing, pp. 725-734, 2000.
McGeehan, "Heat Wave Report: 102 Degrees in Central Park," The New York Times, Jul. 6, 2010.
Perry, "Austrailian Greens Propose a $23/Ton Carbon Tax," Reuters, Jan. 29, 2010.
Pflueger et al., "Data Center Efficiency in the Scalable Enterprise," Dell Power Solutions, pp. 8-14, Feb. 2007.
Qureshi et al., "Cutting the Electric Bill for Internet-Scale Systems," Proceedings of the ACM SIGCOMM Conference on Data Communication, pp. 123-134, Aug. 17-21, 2009.
Sleator et al., "Amortized Efficiency of List Update and Paging Rules," Communications of the ACM, vol. 28, Issue 2, pp. 202-208, Feb. 1985.
"Carbon Tax Center," Retrieved From: <<www.carbontax.org>>, Aug. 5, 2010.
"Windows Azure Platform," Retrieved From: <<www.azure.com>>, Accessed: Aug. 5, 2010.
Bonvin et al., "Autonomic SLA-Driven Provisioning for Cloud Applications," Proceedings of the Eleventh IEEE/ACM Symposium on Cluster, Cloud, and Grid Computing, May 23-25, 2011.
Buyya et al., "Cloudbus Toolkit for Market-Oriented Cloud Computing," Proceedings of the First International Conference on Cloud Computing, pp. 24-44, Oct. 11, 2009.
Grossman, "The Case for Cloud Computing," IT Professional, vol. 11, No. 2, pp. 23-27, Mar. 21, 2009.
Pauley, "Cloud Provider Transparency: An Empirical Evaluation," IEEE Security and Privacy, vol. 8, No. 6, pp. 32-39, Aug. 19, 2010.
Popa et al., "Enabling Security in Cloud Storage SLAs with CloudProof," Microsoft Research Technical Report MSR-TR-2010-46, May 2010, pp. 1-12.
Zhang, "Cloud Computing: State-of-the-Art and Research Challenges," Journal of Internet Services and Applications, vol. 1 No. 1, pp. 7-16, May 2010.
"About Vibes Interactive," Vibes Interactive LLC, Retrieved From: http://www.vibesinteractive.com/about_us.html.
"Consulants: How and Why We Pay Per Performance Works (Part 2—Continuation from Last Post)," Weblog Posting Published Apr. 4, 2010, Retrieved From: http://bizrelationships.wordpress.com/2010/04/19/consultants-how-and-why-pay-per-performance-works-part-2-continuation-from-last-post.
"Sensible Cloud: What is SLA?" Retrieved From: <<http://www.sensiblecloud.com/2010/11/what-is-sla/>>, Retrieved Mar. 24, 2011.
"Tout+Interactive," Latest Publication, Mar. 22, 2011, Retrieved From: <<http://toutinteractive.com>>.
Buchbinder et al., "Online Job-Migration for Reducing the Electricity Bill in the Cloud," Lecture Notes in Computer Science—Networking 2011, vol. 6640, pp. 172-185, 2011.
Buchbinder et al., "Online Job-Migration for Reducing the Electricity Bill in the Cloud (Extended)," Retrieved From: <<http://research.microsoft.com/en-us/um/people/navendu/jobmigration-tr.pdf>>, Retrieved on Mar. 13, 2011.
Borenstein et al., "Dynamic Pricing Advanced Metering, and Demand Response in Electricity Markets," University of California Energy Institute, 2002.
Dunn, David, "Data Center Efficiency Through BCM," Industry Perspectives, 2010.
Fan et al., "Power Provisioning for a Warehouse Sized Computer," Proceedings of the ACM International Symposium on Computer Architecture, Jun. 2007.
Timmer, John, "Renewable Energy and the Future of the Datacenter," Retrieved From: <<http://arstechnica.com/business/news/2008/05renewable-energy-and-the-future-of-the-data-center.ars>>, May 2008.
Jiang et al., "Enabling Autonomic Power-Aware Management of Instrumented Data Centers," Proceedings of the 2009 IEEE International Symposium on Parallel and Distributed Processing, 2009.
Chase et al., "Managing Energy and Server Resources in Hosting Centers," Proceedings of the Eighteenth ACM Symposium on Operating Systems Principals, 2001.
Chen et al., "Energy-Aware Server Provisioning and Load Dispatching for Connection-Intensive Internet Services," Proceedings of the Fifth USENIX Symposium on Networked Systems Design and Implementation, 2008.
"ASG-Workload Optimization Suite for Comprehensive Workload Analysis and Forecasting," Allen Systems Group Incorporated, 2009.
Li et al., "Load Balancing for Multi-Tiered Database Systems Though Autonomic Placement of Materialized Views," Proceedings of the 22nd International Conference on Data Engineering, 2006.
"PlateSpin Recon: Improve Consolidation Ratios," Retrieved From: <<http://www.novell.com/products/recon/consolidation_ratios.html>>, Retrieved on: Mar. 13, 2001.
"Zues Launches Data Center Load Balancing Solution," Retrieved From: <<http://www.continuitycentral.com/news03343.htm>>, 2007.
"The Path to a Green Data Center," Hitachi Data Systems and Brocade, Joint Solution Brief, 2007.
Battles et al., "Reducing Data Center Power Consumption through Efficient Storage," Network Appliance Incorporated Technical Report WP-7010-0207, Feb. 2007.
"Managing Energy Efficiency in the Data Center," Retrieved From: <<http://www.emc.com/collateral/emc-perspective/h4390-manage-energy-ep.pdf>>, EMC Corporation 2008.
"Leading the Evolution of the Data Center," Retrieved From: <<http://www.brocade.com/dowloads/documents/brochures/Leading_the_evolution_of_the_data_Center_BR_00.pdf, Brocade Communications Systems Incorporated, 2008.
U.S. Appl. No. 13/169,923, filed Jun. 27, 2011, Jain et al.
U.S. Appl. No. 13/169,890, filed Jun. 27, 2011, Jain et al.
U.S. Appl. No. 12/492,385, filed Jun. 26, 2009, Horvitz et al.
U.S. Appl. No. 12/781,445, filed May 17, 2010, Burger et al.
U.S. Appl. No. 12/903,227, filed Oct. 13, 2010, Borgs et al.
U.S. Appl. No. 12/951,977, filed Nov. 22, 2010, Jain et al.
U.S. Appl. No. 12/973,399, filed Dec. 20, 2010, Jain et al.
Notice of Allowance dated Jul. 13, 2016 from U.S. Appl. No. 13/169,923, 24 pages.
Non-Final Office Action dated Apr. 27, 2016 from U.S. Appl. No. 13/169,890, 39 pages.
Response filed Apr. 12, 2016 to the Examination report dated Mar. 21, 2016 from European Patent Application No. 10744134.7, 19 pages.

(56) References Cited

OTHER PUBLICATIONS

First Office Action dated May 4, 2016 from China Patent Application No. 201280032040.3, 15 pages.
Terminal Disclaimer and Response filed May 16, 2016 to the Non-Final Office Action dated Apr. 27, 2016 from U.S. Appl. No. 13/169,890, 14 pages.
Response filed Apr. 12, 2016 to the Non-Final Office Action dated Jan. 20, 2016 from U.S. Appl. No. 13/169,923, 14 pages.
Response filed Feb. 16, 2016 to the Office Action dated Dec. 16, 2015 from Korea Patent Application No. 10-2011-7019493, 23 pages.
Notice of Allowance dated Feb. 22, 2016 from Korea Patent Application No. 10-2011-7019493, 6 pages.
Non-Final Office Action dated Jan. 20, 2016 from U.S. Appl. No. 13/169,923, 47 pages.
Response filed Dec. 8, 2015 to Examination Report dated Aug. 10, 2015 from European Patent Application No. 10744134.7, 12 pages.
Advisory Action and After Final Consideration Program Decision dated Nov. 9, 2015 from U.S. Appl. No. 13/169,890, 4 pages.
"Second Office Action," From Chinese Patent Application No. 201080009556.7, dated Feb. 21, 2014.
"Response to the Second Office Action," From Chinese Patent Application No. 201080009556.7, Filed May 7, 2014.
"Response to Rules 70(2) and 70a(2)," From European Patent Application No. 10744134.7, Filed Jan. 30, 2013.
"Second Office Action," From Japanese Patent Application No. 2011-551110, dated Mar. 11, 2014.
Ardagna, "SLA Based Profit Optimization in Multi-Tier Systems," Proceedings of the Fourth IEEE International Symposium on Network Computing and Applications, Jul. 27-29, 2005.
Beloglazov, "Energy Efficient Resource Management in Virtualized Cloud Data Centers," Proceedings of the Tenth IEEE/ACM International Conference on Cluster, Cloud, and Grid Computing, May 17-20, 2010.
Clark, "Live Migration of Virtual Machines," Proceedings of the Second ACM/USENIX Symposium on Networked Systems Design and Implementation, May 2005.
Jain, "An Optimization Framework for Dynamic Client-Server Partitioning in the IMA Application" Apr. 16, 2010.
Karve, "Dynamic Placement for Clustered Web Applications," Proceedings of the Fifteenth International World Wide Web Conference, May 22-26, 2006.
Liu, "GreenCloud: A New Architecture for Green Data Center," Proceedings of the 6th International Conference on Autonomic Computing and Communications Industry Session, Jun. 16, 2009.
"Solar Chimney," Wikipedia, Published on or Before Feb. 27, 2005.
"Solar Updraft Tower," Wikipedia, Published on or Before Aug. 30, 2008.
"International Search Report and Written Opinion," From PCT Application No. PCT/US2012/042110, dated Jan. 31, 2013.
Le, "Managing the Cost, Energy Consumption, and Carbon Footprint of Internet Services," Jun. 14, 2010.
Bianchini, "Power and Energy Management for Server Systems," Nov. 2004.
"First Office Action," From Chinese Patent Application No. 201080009556.7, dated Jul. 29,2013.
"Communication and Extended European Search Report," From European Patent Application No. 10744134.7, dated Nov. 14, 2012.
Felter, "A Performance-Conserving Approach for Reducing Peak Power Consumption in Server Systems," Jun. 2005.
Iranli, "System-Level Power Management: An Overview," The VLSI Handbook Second Edition, Dec. 2006.
"Notice of Rejection," From Japanese Patent Application No. 2011-551110, dated Jul. 2, 2013.
"International Search Report and Written Opinion," From PCT Application No. PCT/US2010/023253, dated Sep. 30, 2012.
Urgaonkar, "Dynamic Provisioning of Multi-Tier Internet Applications," Proceedings of the Second International Conference on Automatic Computing, Jun. 13-16, 2005.

USENIX, "Technical Sessions," Proceedings of the Fifth Usenix Symposium on Networked Systems Design and Implementation, Apr. 16-18, 2008.
Wang, "Feedback Control Algorithms for Power Management of Servers," Proceedings of the Third International Workshop on Feedback Control Implementation and Design in Computing Systems and Networks, Jun. 2008.
Gmach et al., "Capacity Planning and Power Management to Exploit Sustainable Energy," Proceedings of the 2010 International Conference on Network and Service Management, pp. 96-103, Oct. 25-29, 2010.
Giannakoudis et al., "Optimum Design and Operation Under Uncertainty of Power Systems Using Renewable Energy Sources and Hydrogen Storage," International Journal of Hydrogen Energy, vol. 35, Issue 3, pp. 872-891, Feb. 2010.
Kant, "Distributed Energy Adaptive Computing," Proceedings of the IEEE International Conference on Communications, pp. 1, 5, 23-27, May 2010.
Chaver et al., "Energy-Aware Fetch Mechanism: Trace Cache and BTB Customization," Proceedings of the International Symposium on Low Power Electronics and Design, pp. 42, 47, 8-10, Aug. 2005.
Kant, "Power Control of High Speed Network Interconnects in Data Centers," IEEE INFOCOM Workshops, pp. 1,6,19-25, Apr. 2009.
Verma et al., "BrownMap: Enforcing Power Budget in Shared Data Centers," Middleware 2010, Springer Berlin Heidelberg, 2010, pp. 42-63.
Kant, "Data Center Evolution: A Tutorial on State of the Art, Issues, and Challenges," Computer Networks, vol. 53, Issue 17, pp. 2939-2965, Dec. 3, 2009.
Chatwin, "Optimal Dynamic Pricing of Perishable Products with Stochastic Demand and a Finite Set of Prices," European Journal of Operational Research 125, pp. 149-174, Aug. 1, 1997.
Cho et al., "Strategic Consumer Response to Dynamic Pricing of Perishable Products," International Series in Operations Research and Management Science, vol. 131, pp. 435-458, 2010.
Dasu et al., "Dynamic Pricing When Consumers are Strategic: Analysis of a Posted Pricing Scheme," European Journal of Operational Research, vol. 204, Issue 3, pp. 1-23, 2010.
Levin et al., "Dynamic Pricing in the Presence of Strategic Consumers and Oligopolistic Competition," Management Science, vol. 55, No. 1, pp. 32-46, Jan. 2009.
Levin et al., "Optimal Dynamic Pricing of Perishable Items by a Monopolist Facing Strategic Consumers," Production and Operations Management, 2009.
Rasmussen, "Implementing Energy Efficient Data Centers," White Paper #114, American Power Conversion, Retrieved From: <<http://www.apcmedia.com/salestools/NRAN-6LXSHX_R0_EN.pdf, pp. 1-15, 2006.
Sweeting, "Dynamic Pricing Behavior in Perishable Goods Markets: Evidence From the Secondary Markets for Major League Baseball Tickets," Duke University, pp. 1-65, Feb. 2010.
Wang et al., "Markdown Money Contracts for Perishable Goods with Clearance Pricing," European Journal of Operational Research, vol. 196, pp. 1113-1122, 2009.
"International Search Report and Written Opinion," From PCT Application No. PCT/US2011/036364, dated Dec. 23, 2011.
Response filed Aug. 24, 2015 to Final Office Action dated May 14, 2015 from U.S. Appl. No. 13/169,923, 16 pages.
Applicant Initiated Interview Summary dated Aug. 12, 2015, from U.S. Appl. No. 13/169,923, 3 pages.
Office Action dated Aug. 10, 2015 from European Patent Application No. 10744134.7-1954, 6 pages.
Bodik et al., "Response-Time Modeling for Resource Allocation and Energy-Informed SLS's," Proc. Workshop on Statistical Learning Techniques for Solving Systems Problems (MS Sys'07), Dec. 8, 2007, identified at <<http://homepages.inf.ed.ac.uk/csutton/publications/sysml.pdf>> on Jul. 27, 2015, 3 pages.
Second Office Action dated Oct. 9, 2016 from Chinese Patent Application No. 201280032040.3, 14 pages.
Decision to Grant dated Oct. 13, 2016 from European Patent Application No. 10744134.7, 2 pages.

(56) References Cited

OTHER PUBLICATIONS

Response filed Aug. 31, 2016 to the First Office Action dated May 4, 2016 from Chinese Patent Application No. 201280032040.3, 23 pages.
Intention to Grant dated Jul. 15, 2016 from European Patent Application No. 10744134.7, 36 pages.
Notice of Allowance dated Aug. 29, 2016 from U.S. Appl. No. 13/169,890, 21 pages.
Dimosthenis et al., "A Real-time Service Oriented Infrastructure," GSTF Journal on Computing, Feb. 2011, pp. 196-204, 18 pages.
Notice of Allowance dated Sep. 24, 2015 from U.S. Appl. No. 12/779,059, 5 pages.
Applicant Initiated Interview Summary dated Sep. 2, 2015 from U.S. Appl. No. 13/169,890, 3 pages.
U.S. Appl. No. 62/023,772 titled "Power Management of Server Installations" filed Jul. 11, 2014 by Inventors Liu et al., 27 pages.
International Search Report and Written Opinion dated Oct. 23, 2015 from PCT Patent Application No. PCT/US2015/039459, 13 pages.
Response and Demand filed Dec. 28, 2015 to the International Search Report and Written Opinion dated Oct. 23, 2015 from PCT Patent Application No. PCT/US2015/039459, 9 pages.
Second Written Opinion dated Feb. 8, 2016 from PCT Patent Application No. PCT/US2015/039459, 4 pages.
International Preliminary Report on Patentability dated Jun. 6, 2016 from PCT Patent Application No. PCT/US2015/039459, 8 pages.
Non-Final Office Action dated Nov. 19, 2013 from U.S. Appl. No. 13/251,777, 14 pages.
Response filed Feb. 19, 2014 to the Non-Final Office Action dated Nov. 19, 2013 from U.S. Appl. No. 13/251,777, 12 pages.
Final Office Action dated Jul. 15, 2014 from U.S. Appl. No. 13/251,777, 10 pages.
Response filed Oct. 15, 2014 to the Final Office Action dated Jul. 15, 2014 from U.S. Appl. No. 13/251,777, 10 pages.
Notice of Allowance dated Nov. 7, 2014 from U.S. Appl. No. 13/251,777, 5 pages.
Non-Final Office Action dated May 13, 2016 from U.S. Appl. No. 14/679,699, 11 pages.
Response filed Jul. 14, 2016 to the Non-Final Office Action dated May 13, 2016 from U.S. Appl. No. 14/679,699, 9 pages.
Notice of Allowance dated Aug. 10, 2016 from U.S. Appl. No. 14/679,699, 14 pages.
Notice of Allowance and Examiner-Initiated Interview Summary dated Feb. 19, 2013 from U.S. Appl. No. 12/492,385, 14 pages.
Applicant-Initiated Interview Summary dated Oct. 31, 2011 from U.S. Appl. No. 12/391,188, 3 pages.
Applicant-Initiated Interview Summary dated Feb. 22, 2012 from U.S. Appl. No. 12/391,188, 3 pages.
Response filed Nov. 14, 2014 to the Decision on Rejection dated Jul. 31, 2014 from Chinese Patent Application No. 201080009556.7, 12 pages.
Communication pursuant to Rules 70(2) and 70a(2) EPC dated Dec. 3, 2012 from European Patent Application No. 10744134.7, 1 page.
Response filed Aug. 10, 2013 to the Final Office Action dated Apr. 11, 2013 from U.S. Appl. No. 12/779,059, 11 pages.
Notice of Allowance dated Mar. 11, 2014 from U.S. Appl. No. 12/913,763, 22 pages.
U.S. Appl. No. 62/023,777 titled "Server Installation as a Grid Condition Sensor" filed Jul. 11, 2014 by Inventors Liu et al., 30 pages.
Requirement Restriction dated Aug. 8, 2016 from U.S. Appl. No. 14/675,163, 6 pages.
Response filed Sep. 23, 2016 to the Requirement Restriction dated Aug. 8, 2016 from U.S. Appl. No. 14/675,163, 7 pages.
Non-Final Office Action dated Nov. 4, 2016 from U.S. Appl. No. 14/675,163, 34 pages.
Response filed Dec. 8, 2016 to the Non-Final Office Action dated Nov. 4, 2016 from U.S. Appl. No. 14/675,163, 10 pages.
International Search Report and Written Opinion dated Sep. 30, 2015 from PCT Patent Application No. PCT/US2015/039462, 10 pages.
International Preliminary Report on Patentability dated Jul. 12, 2016 from PCT Patent Application No. PCT/US2015/039462, 7 pages.
Response and Demand filed Jan. 13, 2016 to the International Search Report and Written Opinion dated Sep. 30, 2015 from PCT Patent Application No. PCT/US2015/039462, 11 pages.
Second Written Opinion dated Apr. 21, 2016 from PCT Patent Application No. PCT/US2015/039462, 6 pages.
U.S. Appl. No. 62/023,785 titled "Energy Routing Within a Server Installation" filed Jul. 11, 2014 by Inventors Liu et al., 32 pages.
International Search Report and Written Opinion dated Nov. 23, 2015 from PCT Patent Application No. PCT/US2015/039463, 16 pages.
Goiri et al., "Parasol and GreenSwitch: Managing Datacenters Powered by Renewable Energy", International conference on Architectural Support for Programming Languages and Operating Systems, Mar. 16-20, 2013, 13 pages.
Govindan et al., "Benefits and Limitations of Tapping into Stored Energy for Datacenters", Proceedings of the International Sympoisum on Computer Architecture, Jun. 4-8, 2011, 11 pages.
GreenQloud, captured by the Internet archive at <<http://web.archive.org/web/20140629201826/https://www.greenqloud.com/>> on Jun. 29, 2014, 4 pages.
GreenQloud, "GreenQloud Monthly Pricing Calculator," captured by the Internet archive at <<https://web.archive.org/web/20130223025741/http://greenqloud.com/pricing/>> on Feb. 23, 2013, 2 pages.
Gurobi Optimization Inc., "Gurobi Optimization", captured by the Internet archive at <<https://web.archive.org/web/20140701004029/http://www.gurobi.com/>> on Jul. 1, 2014, 2 pages.
Haque et al., "Providing Green SLAs in High Performance Computing Clouds", Proceedings of the Sustainable computing and Comuting for Sustainability International Green Computing Conference, Jun. 27, 2013, 11 pages.
Kirkpatrick, Scott, "Optimization by Simulated Annealing: Quantitative Studies", Journal of Statistical Physics, vol. 34, Nos. 5/6, 1984, pp. 975-986, 12 pages.
Klingert et al., "GreenSLAs for the Energy-efficient Management of Data Centres", International Conference on Energy-Efficient Computing and Networking, May 31-Jun. 1, 2011, 10 pages.
Krioukov et al., "Design and Evaluation of an Energy Agile Computing Cluster", University of California at Berkeley, Technical Report No. UBC/EECS-2012-13, Jan. 17, 2012, 14 pages.
Krioukov et al., "Integrating Renewable Energy Using Data Analytics Systems: Challenges and Opportunities", Bulletin of the IEEE Computer Society Technical Committee on Data Engineering, Mar. 2011, 9 pages.
Le et al., "Cost- and Energy-Aware Load Distribution Across Data Centers", Workshop on Power Aware Computing and Systems, Oct. 2009, 5 pages.
Le et al., "Reducing Electricity Cost Through Virtual Machine Placement in High Performance Computing Clouds", International Conference for High Performance Computing, Networking, Storage and Analysis, Nov. 12-18, 2011, 12 pages.
Levin et al., "Optimal Dynamic Pricing of Perishable Items by a Monopolist Facing Strategic Consumers", Production and Operations Management, 2009, 53 pages.
Li et al., "iSwitch: Coordinating and Optimizing Renewable Energy Powered Server Clusters", International Symposium on Computer Architecture, Jun. 2012, 12 pages.
Lim et al., "Power Budgeting for Virtualized Data Centers", Proceedings of the 2011 USENIX Annual Technical Conference, (USENIX ATC '11), Jun. 15, 2011, 14 pages.
Liu et al., "Renewable and Cooling Aware Workload Management for Sustainable Data Centers", International Conference on Measurement and Modeling of Computer Systems, Jun. 11-15, 2012, 12 pages.

(56) References Cited

OTHER PUBLICATIONS

Mankoff et al., "Some Computer Science Issues in Creating a Sustainable World", Computer, vol. 41, No. 8, Aug. 2008, pp. 94-97, 4 pages.
Maxim Integrated, "Switching Between Battery and External Power Sources", retrieved at http://www.maximintegrated.com/app-notes/index.mvp/id/1136, Jun. 27, 2002, 4 pages.
Miller, Rich, "Data Centers Scale Up Their Solar Power", retrieved at <<http://www.datacenterknowledge.com/archives/2012/05/14/data-centers-scales-up-their-solar-power/>>, May 14, 2012, 2 pages.
Mohsenian-Rad et al., "Coordination of Cloud Computing and Smart Power Grids", First IEEE International Conference on Smart Grid Communications (SmartGridComm), Oct. 4, 2010, pp. 368-372, 5 pages.
Pelley et al., "Power Routing: Dynamic Power Provisioning in the Data Center", International Conference on Architectural Support for Programming Languages and Operating Systems, Mar. 13-17, 2010, 12 pages.
'Sharma et al., "Blink: Managing Server Clusters on Intermittent Power", International Conference on Architectural Support for Programming Languages and Operating Systems, Mar. 5-11, 2011, 14 pages.
Sharma et al., "Cloudy Computing: Leveraging Weather Forecasts in Energy Harvesting Sensor Systems", International Conference on Sensor Mesh and Ad Hoc Communications and Networks, Jun. 2010, 9 pages.
Stewart et al., "Some Joules Are More Precious Than Others: Managing Renewable Energy in the Datacenter", Workshop on Power Aware Computing and Systems, Oct. 2009, 5 pages.
U.S. Energy Information Administration, "Electric Power Monthly", retrieved from <<http://www.eia.gov/electricity/monthly/epm table grapher.cfm?-t=epmt_5_6_b>>, Jan. 2013, 190 pages.
UK Government, "Carbon Reduction Commitment", Oct. 20, 2010, captured by the Internet archive at <<https://web.archive.org/web/20110311230843/http://www.carbonreductioncommitment.info/>>, 3 pages.
Verma et al., "pMapper: Power and Migration Cost Aware Application Placement in Virtualized Systems", International Middleware Conference, Dec. 2008, pp. 243-264, 22 pages.
Wang et al., "Coordination of the Smart Grid and Distributed Data Centers: A Nested Game-Based Optimization Framework", IEEE PES Innovative Smart Grid Technologies Conference, Feb. 19, 2014, 5 pages.
Wang et al., "Datacenters as Controllable Load Resources in the Electricity Market", IEEE 33rd International conference on Distributed Computing Systems, Jul. 8, 2013, pp. 176-185, 10 pages.
Wang et al., "Exploring Smart Grid and Data Center Interactions for Electric Power Load Balancing", ACM SIGMETRICS Performance Evaluation Review, vol. 41, Issue 3, Dec. 2013, 6 pages.
Response filed Feb. 16, 2015 to Examination Report dated Oct. 17, 2014 for European Patent Application No. 10744134.7, 11 pages.
Response filed Jun. 10, 2014 to Second Office Action dated Mar. 11, 2014 for Japan Patent Application No. 2011-551110, 16 pages.
Notice of Allowance dated Nov. 11, 2014 from Japan Patent Application No. 2011-551110, 7 pages.
Notice of Allowance dated Dec. 24, 2014 from U.S. Appl. No. 12/951,977, 7 pages.
Non-Final Office Action dated Jul. 3, 2014 from U.S. Appl. No. 12/973,399, 26 pages.
Requirement for Restriction Election dated Jun. 7, 2012 from U.S. Appl. No. 12/913,763, 10 pages.
Non-Final Office Action dated Dec. 5, 2014 from U.S. Appl. No. 12/779,059, 20 pages.
Non-Final Office Action dated Oct. 7, 2011 from U.S. Appl. No. 12/492,385, 14 pages.
Response filed Jan. 6, 2012 to Non-Final Office Action dated Oct. 7, 2011 from U.S. Appl. No. 12/492,385, 15 pages.
Final Office Action dated Mar. 15, 2012 from U.S. Appl. No. 12/492,385, 16 pages.
Response filed Jul. 16, 2012 to Final Office Action dated Mar. 15, 2012 from U.S. Appl. No. 12/492,385, 17 pages.
Notice of Allowance dated Feb. 19, 2013 from U.S. Appl. No. 12/492,385, 6 pages.
Notice of Allowance dated Jul. 18, 2013 from U.S. Appl. No. 12/492,385, 6 pages.
Requirement for Restriction Election dated Feb. 1, 2013 from U.S. Appl. No. 12/903,227, 6 pages.
Response filed Feb. 27, 2013 to Requirement for Restriction Election dated Feb. 1, 2013 from U.S. Appl. No. 12/903,227, 7 pages.
Non-Final Office Action dated Mar. 29, 2013 from U.S. Appl. No. 12/903,227, 16 pages.
Response filed Aug. 22, 2013 to Non-Final Office Action dated Mar. 29, 2013 from U.S. Appl. No. 12/903,227, 13 pages.
Non-Final Office Action dated May 17, 2013 from U.S. Appl. No. 13/169,923, 11 pages.
Response filed Sep. 6, 2013 to Non-Final Office Action dated May 17, 2013 from U.S. Appl. No. 13/169,923, 14 pages.
Search Report dated Oct. 28, 2014 from European Patent Application No. 12803686.01, 3 pages.
Examination Report dated Dec. 1, 2014 from European Patent Application No. 12803686.01, 4 pages.
Non-Final Office Action dated Aug. 1, 2011 from U.S. Appl. No. 12/391,188, 12 pages.
Response filed Nov. 16, 2011 to Non-Final Office Action dated Aug. 1, 2011 from U.S. Appl. No. 12/391,188, 11 pages.
Final Office Action dated Dec. 19, 2011 from U.S. Appl. No. 12/391,188, 17 pages.
Response filed Mar. 19, 2012 to Final Office Action dated Dec. 19, 2011 from U.S. Appl. No. 12/391,188, 11 pages.
Notice of Allowance dated Apr. 2, 2012 from U.S. Appl. No. 12/391,188, 5 pages.
Requirement for Restriction Election dated Jun. 22, 2012 from U.S. Appl. No. 12/951,977, 6 pages.
Response filed Jul. 23, 2012 to Requirement for Restriction Election dated Jun. 22, 2012 from U.S. Appl. No. 12/951,977, 7 pages.
Requirement for Restriction Election dated Aug. 2, 2012 from U.S. Appl. No. 12/951,977, 7 pages.
Response filed Aug. 13, 2012 to Requirement for Restriction Election dated Aug. 2, 2012 from U.S. Appl. No. 12/951,977, 6 pages.
Non-Final Office Action dated Sep. 4, 2012 from U.S. Appl. No. 12/951,977, 10 pages.
Response filed Nov. 29, 2012 to Non-Final Office Action dated Sep. 4, 2012 from U.S. Appl. No. 12/951,977, 12 pages.
Final Office Action dated Dec. 17, 2012 from U.S. Appl. No. 12/951,977, 19 pages.
Response filed Apr. 17, 2013 to Final Office Action dated Dec. 17, 2012 from U.S. Appl. No. 12/951,977, 15 pages.
Notice of Allowance dated Apr. 15, 2015 from U.S. Appl. No. 12/951,977, 8 pages.
Non-Final Office Action dated Jun. 21, 2012 from U.S. Appl. No. 12/973,399, 20 pages.
Response filed Aug. 27, 2012 to Non-Final Office Action dated Jun. 21, 2012 from U.S. Appl. No. 12/973,399, 18 pages.
Borgs, "Optimal Mechanisms for Perishable Goods With Variable Supply and Demand", Aug. 11, 2010, 8 pages.
Examination report dated Mar. 21, 2016 from European Patent Application No. 10744134.7, 5 pages.
"Amazon EC2 Pricing", captured by the Internet archive at <<https://web.archive.org/web/20130307213605/http://aws.amazon.com/pricing/ec2/>>, on Mar. 7, 2013, 9 pages.
"Amazon Elastic Compute Cloud (Amazon EC2)", captured by the Internet archive at <<https://web.archive.org/web/20130501132521/http://aws.amazon.com/ec2/>>, in May 1, 2013, 15 pages.
"Global Reporting Initiative", captured by the Internet archive at <<http://web.archive.org/web/20140625183534/https://www.globalreporting.org/pages/default.aspx>> on Jun. 25, 2014, 2 pages.
"Green Data Centers Pairing Energy Efficiency with Affordability", Green House Data, captured by the Internet archive at <<http://

(56) References Cited

OTHER PUBLICATIONS web.archive.org/web/20140701072144/http://www.greenhousedata.com/about-us/green-data-centers/>> on Jul. 1, 2014, 3 pages.
"Green Webhosts", EcoBusinessLinks, captured by the Internet archive at <<https://web.archive.org/web/20130122202308/http://www.ecobusinesslinks.com/green webhosts/>>, on Jan. 22, 2013, 4 pages.
"HP Power Capping and HP Dynamic Power Capping for ProLiant servers", retrieved at <<http://h20565.www2.hpe.com/hpsc/doc/public/display?docId=emr_na-c01549455-5&lang=en-us&cc=us>>, Jan. 23, 2014, 25 pages.
"Power Management in the Cisco Unified Computing System: An Integrated Approach", White Paper of Cisco, retrieved at <<http://www.cisco.com/c/en/us/solutions/collateral/data-center-virtualization/unified-computing/white_paper_c11-627731.html>> on Aug. 7, 2014, 17 pages.
"Reducing Data Center Power and Energy Consumption: Saving Money and "Going Green"", retrieved at <<http://www.gtsi.com/cms/documents/white-papers/green-it.pdf>>, Jan. 2010, 16 pages.
"Secure VMware Hosting & Colocation Services," Green House Data, captured by the Internet archive at <<http://web.archive.org/web/20140625065009/http://www.greenhousedata.com/>> on Jun. 25, 2014, 2 pages.
"Server Power Management Comparison: Dell Openmanage Power Center and HP Insight Control", published Sep. 2012, retrieved at<<http://en.community.dell.com/cfs-file.ashx/_key/telligent-evolution-components-attachments/13-4491-00-00-20-22-78-75/Dell-Open-Manage-Power-Center-vs-HP-Insight-Control.pdf, 25 pages.
"Smart Grids Arrive Step by Step", retrieved Jul. 25, 2014, available at: <<http://www.eue24.net/pi/index.php?StoryID=253&articleID=238316>>, 4 pages.
"Grid5000 Project", captured by the Internet archive at <<https://web.archive.org/web/20051028161139/http://www.grid5000.fr>>, on Oct. 28, 2005, 1 page.
AISO.net, captured by the Internet archive at <<http://web.archive.org/web/20140704021857/http://www.aiso.net/>>, on Jul. 4, 2014, 1 page.
Aksanli et al., "Utilizing Green Energy Prediction to Schedule Mixed Batch and Service Jobs in Data Centers", Proceedings of the 4th Workshop on Power-Aware Computing and Systems, Oct. 23, 2011, 5 pages.
Analog Devices, "ADM1191: Digital Power Monitor with Convert Pin and ALERTB Output", Datasheet and Product Info, retrieved from <<http://www.analog.com/en/products/power-management/power-monitors-ic/adm1191.html>>, 1995-2015, pp. 1-7, 7 pages.
Analog Devices, "Digital Power Monitor with Convert Pin and ALERTB Output", ADM1191 Data Sheet, retrieved from <<http://www.analog.com/media/en/technical-documentation/data-sheets/ADM1191.pdf>>, 2006-2012, pp. 1-16, 16 pages.
Analog Devices, "EVAL-ADM1911/EVAL-ADM 1192 User Guide UG-658" retrieved from <<http://www.analog.com/media/en/technical-documentation/evaluation-documentation/EVAL-ADM1191_ADM1192.pdf>>, 2008-2014, pp. 1-24, 24 pages.
Analog Devices, "USB-SDP-CABLEZ User Guide UG-404", retrieved at <<http://www.analog.com/media/en/technical-documentation/user-guides/UG-404.pdf>>, 2012, pp. 1-12, 12 pages.
Apple Inc., "Data Centers & Renewable Energy", captured by the Internet archive at <<https://web.archive.org/web/20130201101842/http://www.apple.com/-environment/renewable-energy/>>, on Feb. 1, 2013, 4 pages.
Benini et al., "Policy Optimization for Dynamic Power Management", IEEE Transactions on Computer-Aided Design DF Integrated Circuits and Systems, vol. 18, No. 6, Jun. 1999, pp. 813-833, 21 pages.
Bobroff et al., "Dynamic Placement of Virtual Machines for Managing SLA Violations", IFIP/IEEE International Symposium on Integrated Network Management, May 2007, 10 pages.
Breitgand et al., "SLA-aware placement of multi-virtual machine elastic services in compute clouds", International Symposium on Integrated Network Management, May 2011, 9 pages.
Chen et al., "Dynamic Server Power Capping for Enabling Data Center Participation in Power Markets", Proceedings of the International Conference on Computer-Aided Design, Nov. 18, 2013, 8 pages.
Chiu et al., "Electric Grid Balancing through Low-Cost Workload Migration", ACM SIGMETRICS Performance Evaluation Review, vol. 40 Issue 3, Dec. 2012, 5 pages.
Deng et al., "Concentrating Renewable Energy in Grid-Tied Datacenters", Proceedings of the International Symposium on Sustainable Systems and Technology, May 2011, 6 pages.
Feitelson, D., "Parallel Workload Archive", 2009, retrieved at <<http://www.cs.huji.ac.il/labs/parallel/workload/_anl_int/index.html>>, 5 pages.
Ganti et al., "Smart Grid as a Driver for Energy-Intensive Industries: A Data Center Case Study", Proceedings of Grid-Interop, Dec. 3, 2012, 7 pages.
Goiri et al., "Energy-aware Scheduling in Virtualized Datacenters", IEEE International Conference on Cluster Computing, Sep. 2010, 10 pages.
Goiri et al., "GreenHadoop: Leveraging Green Energy in Data-Processing Frameworks", ACM European Conference on Computer Systems, Apr. 10-13, 2012, 14 pages.
Goiri et al., "GreenSlot: Scheduling Energy Consumption in Green Datacenters", International Conference for High Performance Computing, Networking, Storage and Analysis, Nov. 12-18, 2011, 11 pages.
After Final Pilot 2.0 Request and Response filed Oct. 30, 2015 to the Final Office Action dated Jun. 5, 2015 from U.S. Appl. No. 13/169,890, 17 pages.
International Report on Patentability dated Aug. 23, 2011 from PCT Application No. PCT/US2010/023253, 5 pages.
International Report on Patentability dated Nov. 20, 2012 from PCT Patent Application PCT/US2011/036364, 4 pages.
International Report on Patentability dated Jan. 7, 2014 from PCT Patent Application No. PCT/US2012/042110, 6 pages.
Request for Reexamination filed Jun. 30, 2017 from Chinese Patent Application No. 201280032040.3, 8 pages.
Amendment filed Jun. 30, 2017 from Chinese Patent Application No. 201580037843.1, 13 pages.
Response filed Jun. 26, 2017 to the Final Office Action dated Mar. 24, 2017 from U.S. Appl. No. 14/675,163, 12 pages.
Applicant-Initiated Interview Summary and Office Appendix dated Jun. 28, 2017 from U.S. Appl. No. 14/675,163, 4 pages.
Notice of Allowance dated Aug. 21, 2017 from U.S. Appl. No. 14/675,163, 24 pages.
Response filed Jul. 21, 2017 to the Communication Pursuant to Rules 161(1) and 162 EPC dated Feb. 17, 2017 from European Patent Application No. 15741442.6, 8 pages.
Restriction Requirement dated Sep. 7, 2017 from U.S. Appl. No. 14/673,829, 6 pages.
Response filed Aug. 2, 2017 to the Communication dated Feb. 17, 2017 from European Patent Application No. 15739732.4, 8 pages.
Non-Final Office Action dated Apr. 10, 2017 from U.S. Appl. No. 14/674,821, 91 pages.
Final Office Action dated Mar. 24, 2017 from U.S. Appl. No. 14/675,163, 120 pages.
International Preliminary Report on Patentability dated Jan. 26, 2017 from PCT Patent Application No. PCT/US2015/039463, 9 pages.
Communication pursuant to Rules 161(1) and 162 EPC dated Feb. 17, 2017 from European Patent Application No. 15741442.6, 2 pages.
"Amendment Filed in Chinese Patent Application No. 201580048797.5", Filed Date: Sep. 7, 2017, 16 Pages.
"Amendment Filed in Chinese Patent Application No. 201580044786.X", Filed Date: Sep. 21, 2017, 12 Pages.

* cited by examiner

DATA CENTER SYSTEM THAT ACCOMMODATES EPISODIC COMPUTATION

CROSS-REFERENCE TO RELATED APPLICATIONS

This patent application is a divisional of, and claims priority to, U.S. patent application Ser. No. 12/913,763, filed on Oct. 28, 2010, which is incorporated herein by reference in its entirety.

BACKGROUND

Data centers provide computational resources for executing applications. In one scenario, for example, an entity may instruct a data center to execute an application which it has developed. Further, the entity may specify a Service Level Agreement (SLA) which describes the particular manner in which the data center is requested to execute the application. The data center then executes the application on behalf of the entity, pursuant to the SLA, and returns the results of its computation to the entity. Typically the data center charges the entity a flat stated price for its services.

Present-day data centers receive all (or most) of their power from conventional utility power sources. The utility power sources deliver power to the data centers via an established power distribution infrastructure, commonly referred to as the power grid. As such, such utility power sources are referred to herein as on-grid power sources.

On-grid power sources have one or more shortcomings. First, on-grid power sources are expanding at a much slower rate than data center systems, and therefore will likely fail to fully meet the growing energy demands of these systems. Second, on-grid power sources are expensive and can be expected to markedly increase in cost over time. Moreover, governmental authorities can be expected to levy increasing "carbon taxes" on fossil fuels, increasing the costs of on-grid power sources which rely on these fuels. Third, on-grid power sources provide an expensive, invasive, and inefficient mechanism for delivering power to consuming entities. For example, the power distribution infrastructure typically uses various power transformation mechanisms in the delivery of power. These transformation mechanisms result in the loss of a certain percentage of power during distribution. Fourth, there are factors which limit the transfer power from one site to another. For instance, connectivity may not exist to transfer power from a first site (in which power is over-abundant) to a second site (in which power is lacking). And even if a connection exists, the transmission lines may place limits on the amount of power that can be transferred. These deficiencies are representative, rather than exhaustive; on-grid power sources may suffer from yet other shortcomings.

For these reasons, the utility companies and other actors have become increasingly interested in the prospect of renewable energy sources, such as wind power sources, solar power sources, etc. These renewable power sources are typically connected to the grid, where that grid has been historically associated with a conventional utility power source.

However, renewable power sources have their own respective shortcomings Foremost, renewable power sources provide power which varies over time and location. In the terminology used herein, such power sources are said to be episodic. For example, a wind power source cannot provide power when the wind is not blowing and a solar power source cannot provide power when the sun is not shining. This characteristic is problematic for any entity which relies on these renewable power sources, such as utility entities and data centers. For instance, data center functionality attempts to deliver services to consuming entities in a timely fashion, whenever the consuming entities request the services. This goal is jeopardized by an episodic power source. Further, data center equipment is expensive, which means that is disadvantageous to leave part of the data center idle while adequate power is unavailable. Moreover, it is a time-consuming and expensive task to turn data center equipment on and off to accommodate episodic power availability.

SUMMARY

A data center system is described herein which includes plural data centers powered by plural power sources. The power sources can include any combination of renewable power sources (such as wind power sources, solar power sources, etc.) and traditional utility power sources. The renewable power sources may correspond to off-grid power sources (meaning that they are not connected to the grid) and/or on-grid power sources (meaning that they are connected to the grid). The data center system also includes a management system for managing execution of a plurality of computational tasks by the plurality of data centers. The computational tasks, in turn, include plural parts referred to as data components herein. The management system performs it operation by moving data components to the sites where power is available and cost-effective, in lieu of, or in addition to, moving power to the sites of computational need.

According to one illustrative aspect, the management system includes a temporal movement determination module that adjusts a time at which a data component, associated with a computational task, is to be performed within a data center. For example, the temporal movement determination module can move a data component that is originally designated to be performed at a time t to a time prior to the time t. In addition, or alternatively, the temporal movement determination module can move a data component that is originally designated to be performed at a time t to a time after the time t. In addition, or alternatively, the temporal movement determination module can suspend the execution of a data component, and then later resume the execution of the data component.

According to another illustrative aspect, the management system includes a spatial movement determination module that moves a data component from a first data center to a second data center, or, more generally, moves the data component from a first location to a second location (within the same data center or between data centers). In one implementation, the spatial movement determination module is configured to move the data component based on consideration of, potentially, multiple factors, such as the processing costs associated with executing the data component using different data centers, etc.

According to another illustrative aspect, the management system is configured to manage the execution of a plurality of computational tasks based on an information inventory paradigm. In this approach, for each computational task, a data center operates by converting an input data component and an amount of a power resource into an output data component. Further, the data center may store intermediate data components in the course of its execution of the computational task. The information inventory paradigm involves executing the plurality of computational tasks based on consideration of various costs associated with the flow of data components through the data center system.

According to another illustrative aspect, the management system includes a price determination module that dynamically determines prices associated with the execution of computational tasks within the data center system. In one implementation, for instance, the price determination module determines the prices based on the availability and characteristics of power sources in the data center system. For example, the price determination module selects a price for a computational task based on an extent to which movement of its data components is permitted, to thereby leverage at least one power source having a lower cost compared to another power source.

According to another illustrative aspect, the price determination module includes a supply determination module configured to determine a supply curve associated with an availability of a computational resource over a prescribed span of time. The price determination module also includes a demand determination module configured to determine a demand curve that expresses a demand for the computational resource as a function of price assigned to the computational resource, for a particular time. The price determination module also includes a price assessment module configured to determine a price at which to provide the computational resource at the particular time based on the supply curve and the demand curve. In one implementation, the supply determination module and the demand determination module include prediction modules for predicting supply information and demand information, respectively. In one implementation, the price determination module can also determine plural supply curves and demand curves for different respective service classes of consuming entities.

According to another illustrative aspect, the price determination module is configured to govern execution of a computational task such that Service Level Agreement (SLA) requirements for the task are satisfied, but that the SLA requirements are not exceeded. In connection therewith, the management system may migrate a data component from a first data center to a second data center, even though there are ample resources at the first data center to handle the data component. By doing so, the management system frees up the first data center to handle tasks with more stringent SLA requirements. The price determination module can leverage this manner of operation by selling more high-performance services (at higher costs) to those entities that actually need these services.

According to another illustrative aspect, the price determination module includes an auction module configured to determine the prices based on bids received by entities. The price determination module can also include a bid assistance module configured to assist the entities in submitting bids to the auction module.

According to another illustrative aspect, the data center system includes a "stripped down" architecture that complements its design philosophy. For example at least one of the data centers in the data center system can omit one or more of: (a) power backup mechanisms; (b) redundant components; (c) power converter components; (d) housing components, etc. Moreover, in one implementation, the data center system is set up such that it de-allocates failed computational components without servicing or replacing them.

The above functionality can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A provides an overview of a data center system that relies on one or more renewable power resources. This section also describes movement of data components within the data center system. Section B describes illustrative pricing functionality that can be used to determine prices within the data center system of Section A. Section C describes illustrative migration functionality that can be used to transfer data components among data centers (or, more generally, among locations) in the data center system of Section A. Section D describes different hardware architectures that can be used to construct the data centers of Section A. And Section E describes illustrative processing functionality that can be used to implement any aspect of the features described in Sections A-D.

This application is related to copending and commonly assigned application Ser. No. 12/492,385, filed on Jun. 26, 2009, naming the inventors of Horvitz et al., entitled "Precomputation for Data Center Load Balancing." This related application is incorporated by reference herein in its entirety.

Figure 14:
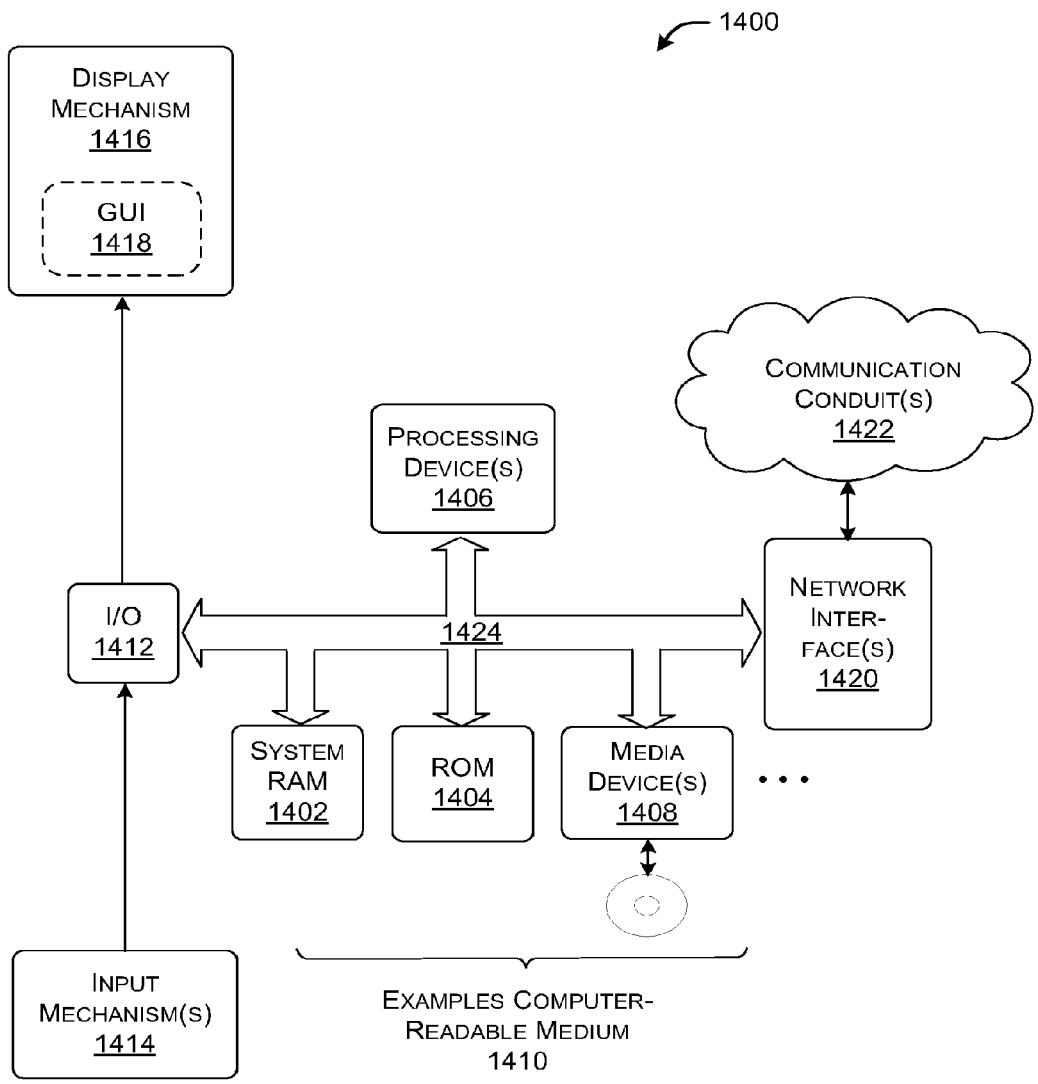
FIG. 14 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 14, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

Figure 1:
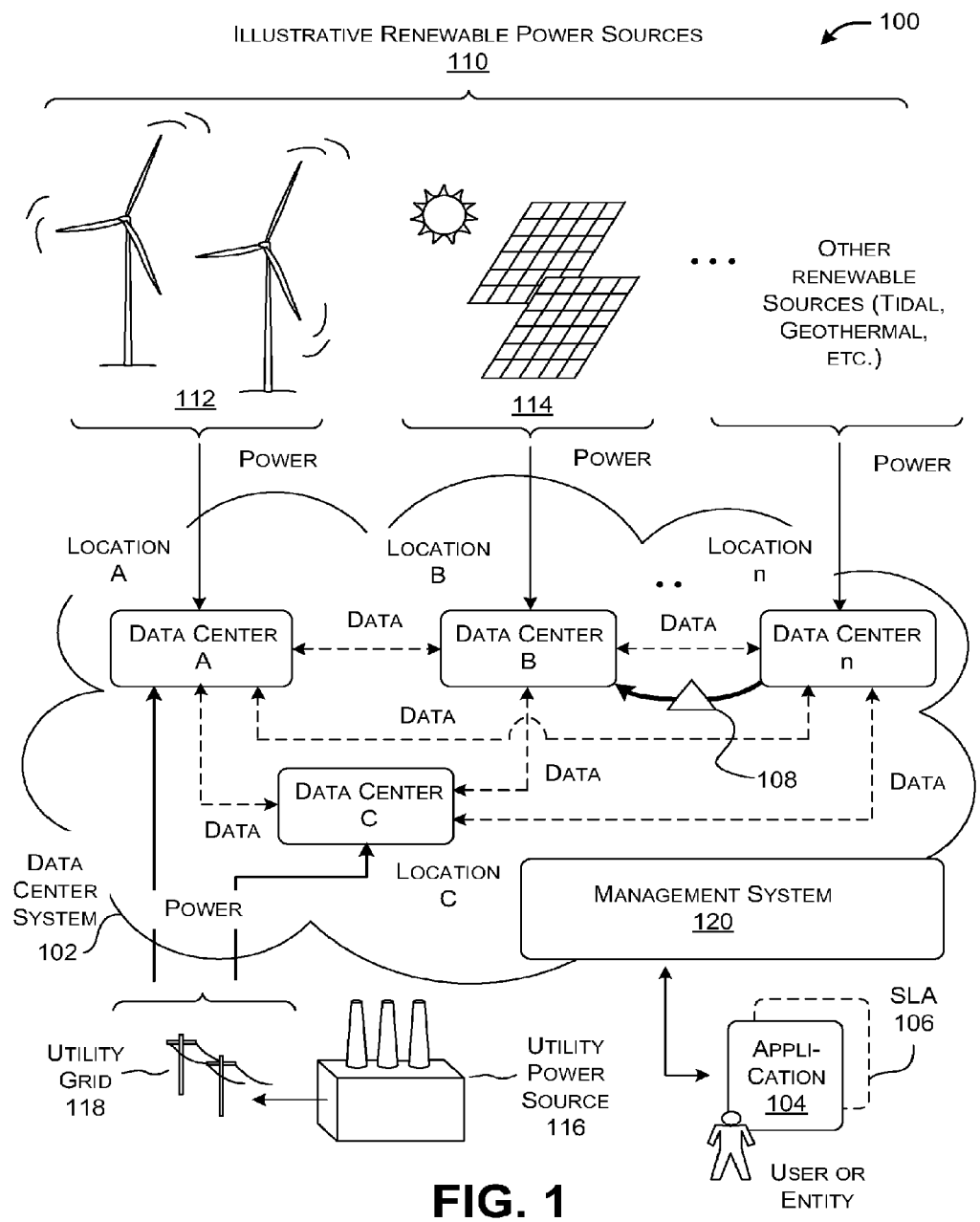
FIG. 1 shows an illustrative environment that provides a data center system, governed by a management system. The data center system relies on one or more renewable power sources, some of which may represent off-grid power sources.

A. Overview of an Illustrative Data. Center System and Data Movement within the Data Center System FIG. 1 shows an environment 100 that includes a data center system 102. The data center system 102 includes plural data centers. Namely, FIG. 1 shows an illustrative group of five data centers, labeled A, B, C, D, and n, although the data center system 102 can include any number of data centers. The collection of data centers in the data center system 102 provides a "cloud" of computing resources.

Any data center, in turn, includes computational resources for performing computational tasks. The term computational task is to be construed broadly as used herein. In one context, a data center performs a computational task by transforming information from one state to another. Alternatively, or in addition, a data center performs a computational task by storing data. In other words, the data center system 102 can provide cloud computing resources and cloud storage resources.

In one scenario, for example, an entity may develop an application 104 that performs a computational task. Here, the entity may correspond to an individual or an organization or some other agent. The entity may provide the application 104 to the data center system 102 to be executed at one or more of its data centers. The entity may also submit Service Level Agreement (SLA) information 106 to the data center system 102. The SLA information 106 describes the manner in which the data center system 102 is requested to execute the application 104 (to be described in greater detail below). In another scenario, the data center system 102 may already host a number of applications. Any entity may then utilize the services of the applications. In general, in one scenario, the data center system 102 may charge a fee for the execution of computational tasks.

More specifically, the computational resources provided by each data center can include a plurality of server computers and associated data stores (not shown). Each data center can also optionally include cooling equipment, network coupling equipment, and so forth. An entity may interact with any data center via a network of any type, such as a wide area network (such as the Internet), a local area network, or any combination thereof. The network itself can be physically implemented using any type of hardwired links, wireless links, name servers, gateways, and so on, as governed by any protocol or combination of protocols.

Likewise, any type of coupling mechanism can connect the various data centers together, including any type of wide area network, local area network, point-to-point connection, or combination thereof. FIG. 1 illustrates the coupling mechanism using dashed lines that connect the data centers. For instance, in one merely illustrative case, the data center system 102 can use, in part, fiber optic cables to couple the data centers together.

As will be described below, the data center system 102 relies on the coupling mechanism to transfer data components between data centers in the data center system 102, or, more generally, between locations within the data center system 102. For example, FIG. 1 shows that data center n is the process of transferring a data component 108 to data center B. As the term is used herein, a data component refers to any part of a computational task. The transfer of the data component 108 allows data center B to perform execution of the part(s) of the computational task that are associated with the data component 108. In one implementation, a data component can be expressed using program state information.

The data centers shown in FIG. 1 receive power from plural power resources. Some of the power sources correspond to renewable power sources. For example, a first power source corresponds to a wind power source 112, powered by the wind. A second power source corresponds to a solar power source 114, powered by sunlight. Other possible renewable power sources 110 include tidal power sources, geothermal power sources, and so on. In each case, the renewable power sources 110 convert natural resources that can be replenished to power, e.g., in the form of electricity.

In at least some cases, the renewable power sources 110 are not connected to an established infrastructure for delivering power to destination entities. As such, at least one of the renewable power sources 110 may constitute an off-grid power source, indicating that it is not connected to an established utility grid. Indeed, in one case, all of the renewable power sources 110 may constitute off-grid power sources. Further, in at least one case, a renewable power source can be generally co-located with the data center to which it provides power. For example, the wind power source 112 can be located in the same general region as data center A, and the solar power source 114 can be located in the same general region as data center B. Alternatively, or in addition, at least some of the renewable power sources 110 can be connected to the grid.

As a consequence of this possible co-location, a renewable power source (and the data source which it powers) can eliminate some of the infrastructure associated with conventional power distribution infrastructure. For example, the data center system 102 can eliminate or reduce, in some instances, the use of power transformation equipment. And as a result, the data center system 102 can eliminate or reduce the power losses and transmission limits that have been traditionally associated with power transformation equipment. Further, a co-located renewable power source is less disruptive to the surrounding environment, e.g., because it does not require high voltage power lines that span long distances. Section D (below) will provide further details on possible architectures of data centers. Such architecture are designed to complement the use of renewable power sources, e.g., by eliminating traditional features that do not serve useful functions in the context of the data-centric environment 100 shown in FIG. 1.

In addition, one or more data centers in the data center system 102 may optionally rely on power generated by more traditional sources. For example, FIG. 1 shows one such traditional utility power source 116. The utility power source 116 may correspond to a plant which consumes fossil fuel(s) (such as coal), a hydroelectric plant, and so on. Although not shown, the data center system 102 can rely on plural such established utility power sources. A utility power source generally provides a reliable (e.g., generally non-episodic) mechanism for delivering power to the data centers. However, at least one of the utility power sources, at some of the times, may also offer performance that is episodic or otherwise unreliable to varying extents.

An established utility grid 118 delivers the power generated by the utility power source 116 to one or more of the data centers shown in FIG. 1. For example, data center C relies on power that is exclusively provided by the utility power source 116. In contrast, data center A receives power from both the wind power source 112 and the utility power source 116. Data center C and data center A may be provided at a remote location with respect to the utility power source 116. In other words, these data centers may not be co-located with the utility power source 116.

Figure 6:
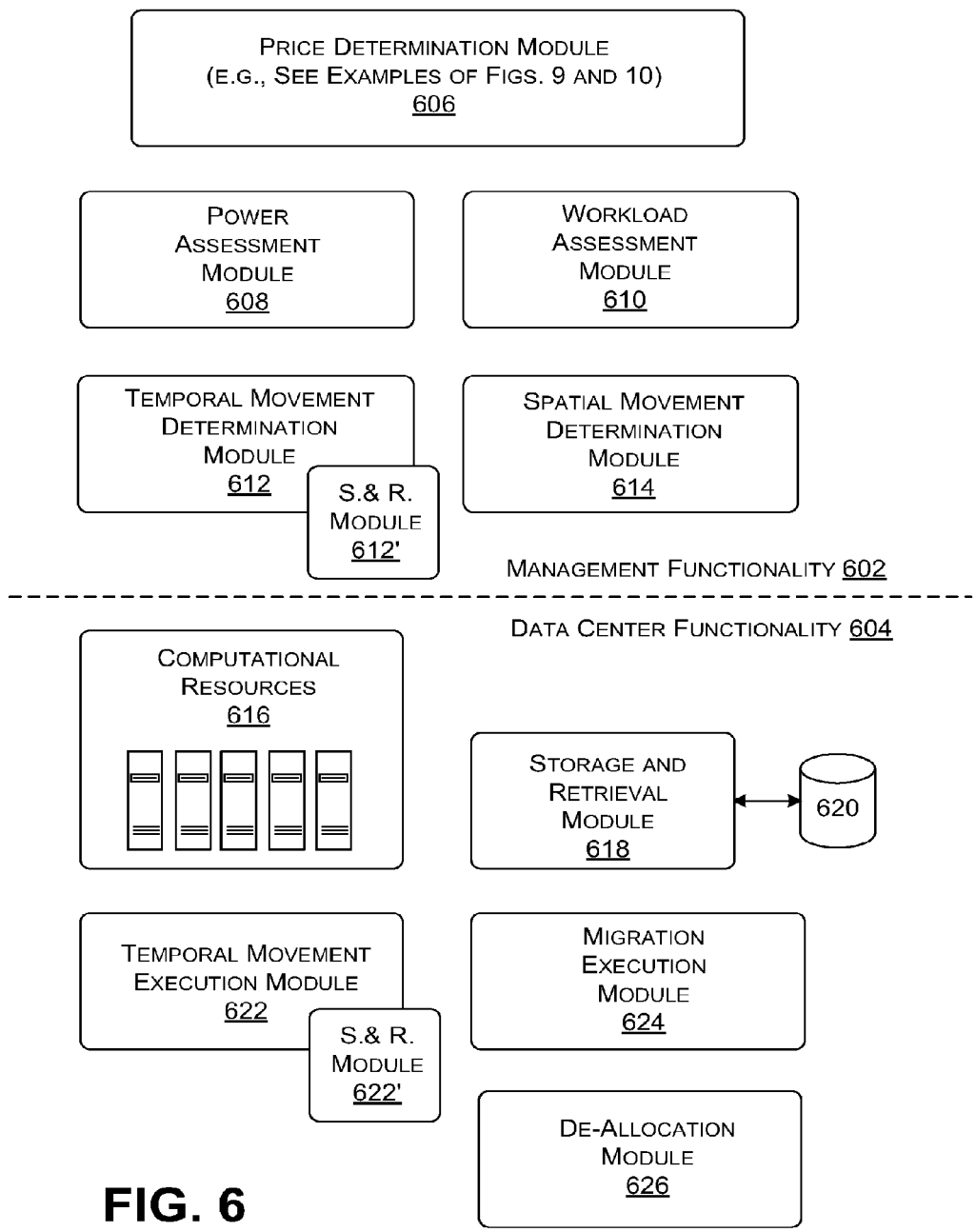
FIG. 6 shows an illustrative architecture of the management system of FIG. 1, together with one of the data centers.

Finally, a management system 120 coordinates the execution of computational tasks within the data center system 102. FIG. 6 (to be described below) provides information regarding the functions performed by the management system 120. By way of overview, the management system 120 can govern the movement of data components within the data center system 102 in the course of executing a computational task. To repeat, a data component refers to any part of a computational task. For example, assume that a computational task involves a data component that will, if executed in normal unmodified fashion, be executed at time t. The management system 120 can determine that it is appropriate to instead execute the data component at a time prior to time t. This is referred to as a pre-computation herein. Alternatively, or in addition, the management system 120 can determine that it is appropriate to execute the data component at a time after the time t. This is referred to as delayed computation herein. In general, this disclosure refers to movement of data components within the infrastructure of an individual data center (or other locus of computation) as temporal movement.

Figure 2:
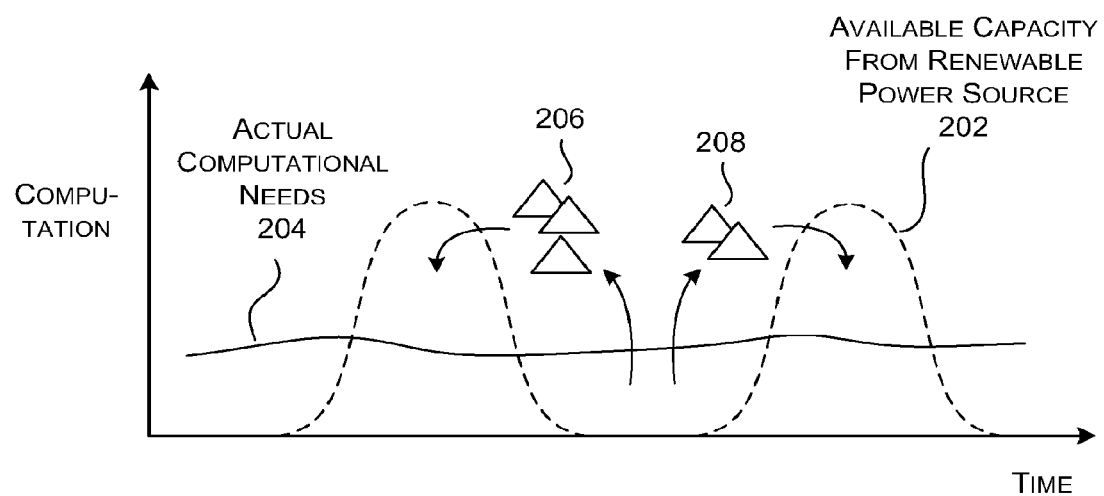
FIG. 2 shows an example of temporal movement of data components associated with a computational task. That is, temporal movement occurs within a particular data center of the data center system of FIG. 1.
Figure 3:
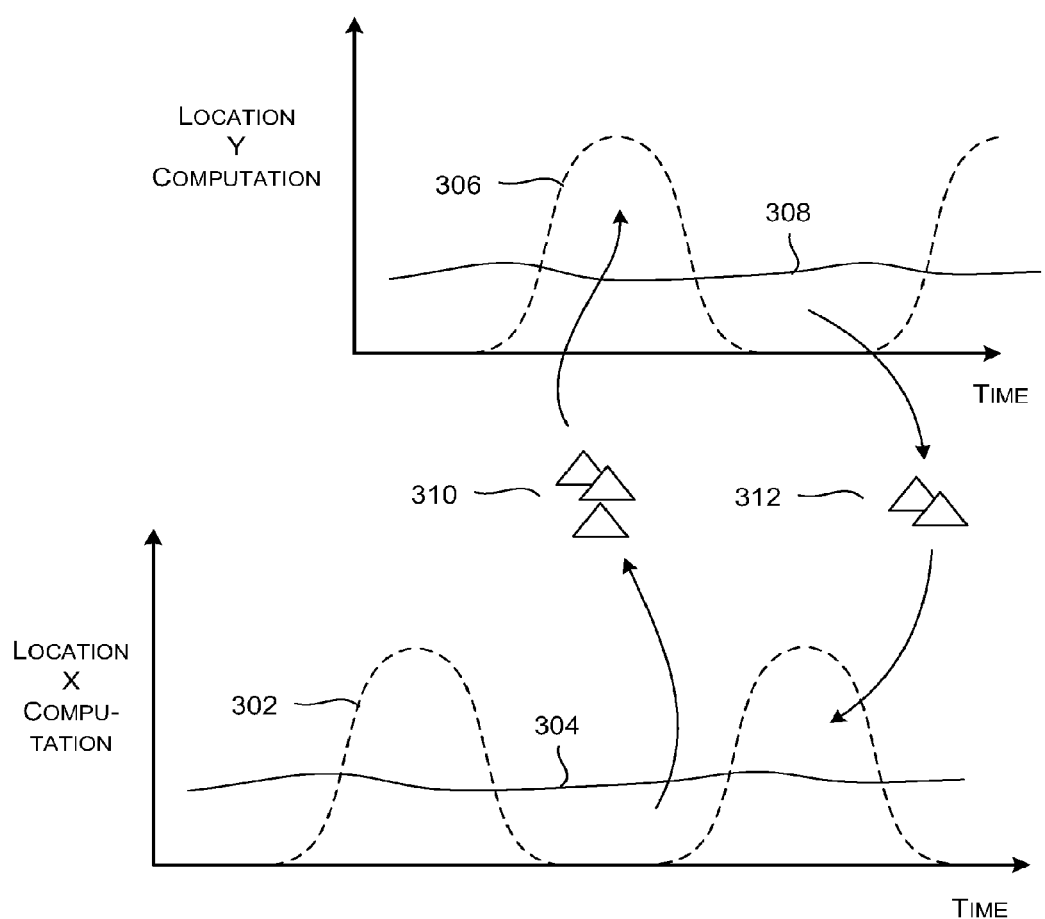
FIG. 3 shows an example of spatial movement of data components from a first data center to a second data center, or, more generally, from a first location to a second location.
Figure 4:
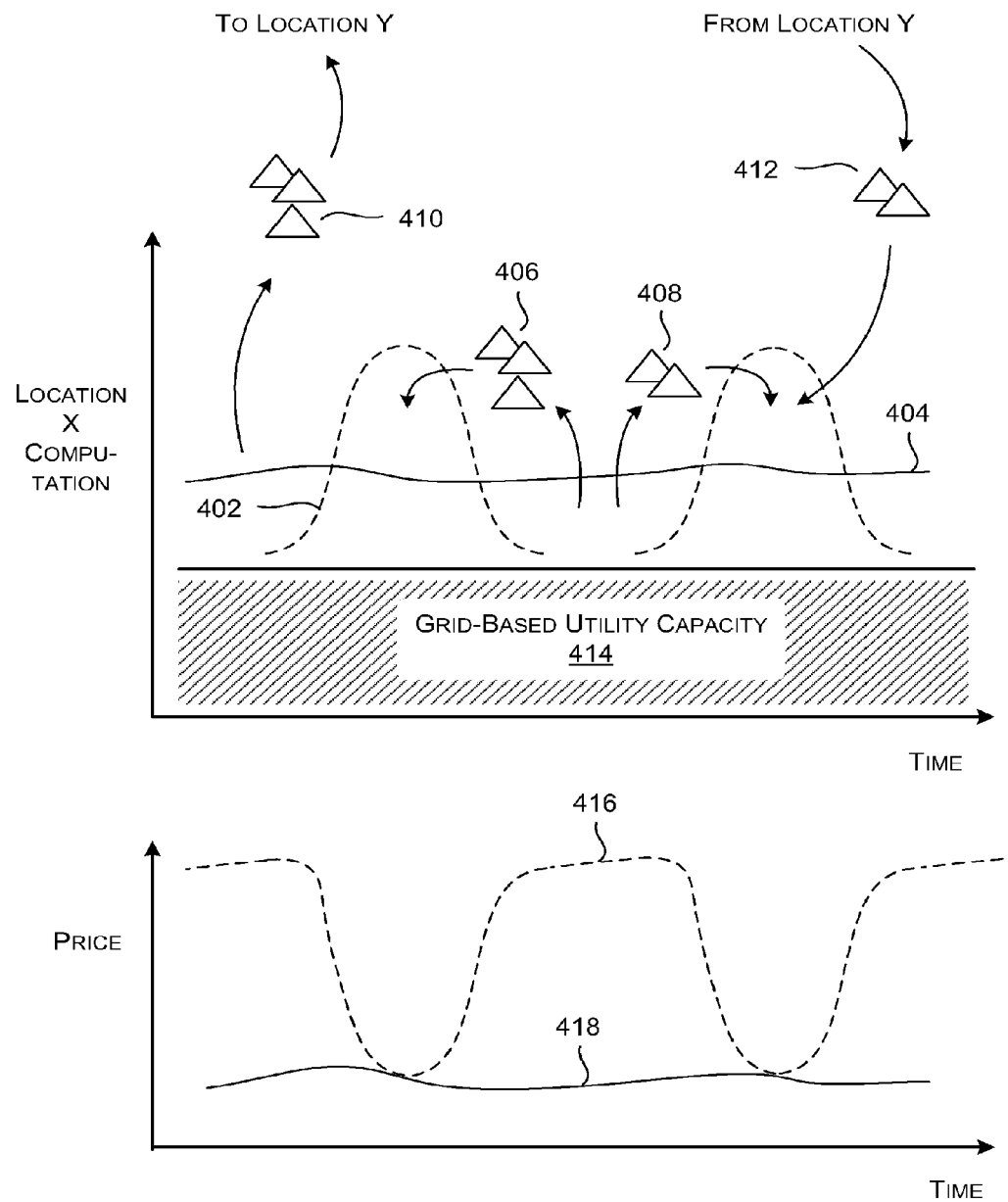
FIG. 4 shows an example of both temporal movement and spatial movement within a particular data center. Moreover, in this example, the data center relies on an on-grid power source. This figure also shows different pricing models associated with services offered by the data center.

In addition, or alternatively, the management system 120 can determine that it is appropriate to execute the data component at an entirely different data center, or, more generally, at a different location. In this case, for example, the management system 120 can coordinate the movement of the data component from a first data center to a second data center, as indicated in the example of FIG. 1, in which the data component 108 is moved from data center n to data center B. This disclosure refers to movement of data components between data centers as spatial movement because it involves moving the locus of computation. FIGS. 2-4, to be described shortly, provide examples of both temporal movement and spatial movement. That description will also clarify the circumstances in which it may be appropriate to perform these types of movements.

In another case, the management system 120 can move a data component in both the temporal dimension (e.g., by performing pre-computation or delayed computation or both) and the spatial dimension (e.g., by moving the data component from one location to another in the data center system 102).

The management system 120 is shown as distinct from the individual data centers to facilitate explanation. In one case, in fact, the management system 120 can be implemented by processing equipment (e.g., one or more computer servers, data stores, etc.) which is distinct from the processing equipment provided by the data centers themselves. In this implementation, the management system 120 can be viewed as a software layer which "sits on top" of the functionality provided by the data centers. In another implementation, the functionality provided by the management system 120 can be implemented, in distributed fashion, by the processing equipment provided by the individual data centers. In another implementation, some of the functionality provided by the management system 120 can be implemented by a separate system and some of the functionality provided by the management system 120 can be implemented by the processing equipment provided by the data centers. This third option can accommodate a hierarchical control strategy. In this approach, the processing equipment provided by the individual data centers provides local management decisions, while the processing equipment provided by the top-level processing equipment provides higher-level management decisions, which may depend on the local management decisions. In addition, the data center system 102 can include one or more redundant management systems (e.g., to provide desired fault tolerance). Further, in one approach, management functionality can make a final management decision based on individual management decisions provided by plural respective management systems (not shown), e.g., using any type of voting protocol. The management system 120 can be implemented in yet other ways.

Considered as a whole, the data center system 102 of FIG. 2 introduces a new paradigm for delivering services to customer. From a historical perspective, the industry began by distributing physical resources (e.g., coal) to the destination sites (e.g., homes) of entities, at which the resources were consumed. Next, the industry provided electricity to the destination sites of consumers via an established power distribution infrastructure. In contrast, the data center system 102 attempts, when possible, to provide data for processing at the sites where power is produced, that is, essentially bringing the data to the power instead of the power to the data. Further, the data center system 102 generally caches data rather than storing and transforming power. Generally stated, the architecture shown in FIG. 1 treats data as the "free variable" that can be manipulated to achieve consumer objectives, not power.

The movement of data (instead of power) allows the data center system 102 to achieve other potential objectives. For instance, the movement can direct tasks to the sites where the tasks are most efficiently carried out, e.g., depending on the different respective capabilities of individual data centers. Further, the movement allows any data center to more effectively operate at its full capacity or near-full capacity. This is beneficial because it reduces the costs associated with computational resources that are powered up but nonetheless idle. It also reduces the need to power down idle computational resources (since few if any of the computational resources will be idle).

As another feature, the movement of data (instead of power) can achieve other goals, such as reduction of carbon footprint, reduction in processing time, and so on. Generally, the management system 120 can select the control strategy (or strategies) that will govern the operation of the data center system 102 so as to achieve an overriding objective, such as a desired Total Cost of Ownership (TCO).

FIGS. 2-4 show examples of temporal movement of data components and location-based (i.e., spatial) movement of data components. Starting with FIG. 2, this figure shows computational capacity 202 that can be provided at a data center based on a renewable power source, such as the solar power source 114 of FIG. 1. As shown, the available computational capacity 202 has an undulating shape that reflects the availability of power throughout a 24 hour cycle. In the daylight hours, sunlight is available, so computational capacity 202 is available. In the nighttime hours, sunlight is not available, so computational capacity 202 is not available. FIG. 2 also shows the actual computational needs 204 that the data center uses to perform its allocated computational tasks. The problem that arises is apparent from FIG. 2: during nighttime hours, the data center provides insufficient computational capacity to meet computational needs.

To address this situation, the management system 120 determines whether it can modify the execution of a computational task so that at least one of its data components is executed in advance, and/or at least one of its data components is executed in delayed fashion. Consider the following example where this may hold true. A monthly billing operation (and associated application) may involve three basic tasks. A first data component may involve adding new clients that were encountered in the course of a month to a customer database. A second component may involve processing invoices and making payments based on contractual timeliness commitments. A third component may involve performing follow-up activities, such as performing various tax-related accounting operations. In this case, the management system 120 can analyze the application and determine that only the second data component needs to be performed at a particular time. At least a part of the first data component can be performed prior to the end of the month. And at least a part of the third data component can be performed after the end of the month.

In this scenario, the management system 120 can therefore orchestrate pre-computation on the first data component, namely at some time prior to the end of the month at a time of day when there is available capacity in the data center (e.g., when the sun is shining). Movement 206 illustrates this kind of temporal movement of data components. The management system 120 can also perform delayed computation on the third data component, namely at some time after the end of the month, again, at a time of day when there is available capacity. Movement 208 illustrates this kind of temporal movement of data components.

If pre-computation and/or delayed computation cannot be performed, the data center may not be able to proceed with a computational task. In this case, if possible, the data center can store the state of the computational task at the time of interruption. The data center can then retrieve the program state and resume the computational task when power again becomes available.

More specifically, in one case, the management system 120 can predict the loss of computational capacity, e.g., based on historical supply information (e.g., which may reveal a generally cyclical supply) and/or contemporaneous assessments of waning computational capacity. In response, the management system 120 can store program state to the extent possible prior to the complete loss of power and the interruption of the computational task. Alternatively, or in addition, a data center may employ a backup power system to store program state upon an interruption. Alternatively, or in addition, a data center can use any kind of non-volatile memory (such as phase change memory) which preserves data state when power is turned off.

FIG. 3, by contrast, shows an example of spatial (e.g., location-based) movement. In this example, the management system 220 coordinates the transfer of data components from a location X to a location Y. Location X has the same type of undulating available capacity 302 as FIG. 2, e.g., attributed to the use of solar power. Further, location X exhibits actual computational needs 304. Location Y also has an undulating available capacity 306 and actual computational needs 308. However, the undulating available capacity 306 of location Y complements the undulating available capacity 302 of location X because daytime at location Y corresponds to nighttime at location X. This means that the management system 120 can address lulls in the available capacity 302 of location X by sending data components to location Y at the time of the lulls. Movement 310 illustrates this type of spatial movement. Further, the management system 120 can address hills in the available capacity 306 of location Y by sending data components to location X at the time of the lulls. Movement 312 illustrates this type of spatial movement. As will be described, these types of movements may incur bandwidth and latency-related costs, as well as other performance-related costs.

FIG. 4 shows a scenario which combines the temporal movement of FIG. 2 and the spatial movement of FIG. 3. In other words, in this scenario, the management system 120 can draw from a wider range of options in determining how to address lulls in available capacity 402 at location X. That is, the management system 120 can address computational needs 404 by performing pre-computation (as shown in movement 406), delayed computation (as shown in movement 408), or spatial movement to location Y (as shown in movement 410). In movement 412, location X receives data components from location Y. Although not shown, the management system 120 can perform both temporal and spatial movement of a data component, e.g., by sending the data component to another data center and also performing pre-computation or delayed computation on that data component at that other data center.

FIG. 4 also shows a scenario in which location X can rely on a fixed on-grid power source, providing a grid-based utility capacity 414. Accordingly, in addition to the above strategies, the data center at location X can use part of the grid-based utility capacity 414 to address lulls in the undulating available capacity 402 associated with a renewable power source. This may, however, incur a higher cost compared to reliance on the reliable power source, as will be described in greater detail in Section B.

More generally, the management system 120 can use different overarching paradigms to manage the execution of computation tasks. In one approach, the management system 120 adopts an information inventory paradigm to manage the data center system 102. In this approach, the management system 120 treats the data centers as akin to manufacturing plants that receive raw material, perform operations on the raw material to produce tangible products, and then output the tangible products to consumers. In the course of this processing, a manufacturing plant may produce or otherwise maintain an inventory of intermediary parts. Further, different manufacturing plants may trade resources with each other to leverage local efficiencies that may be present at different manufacturing plants.

Figure 5:
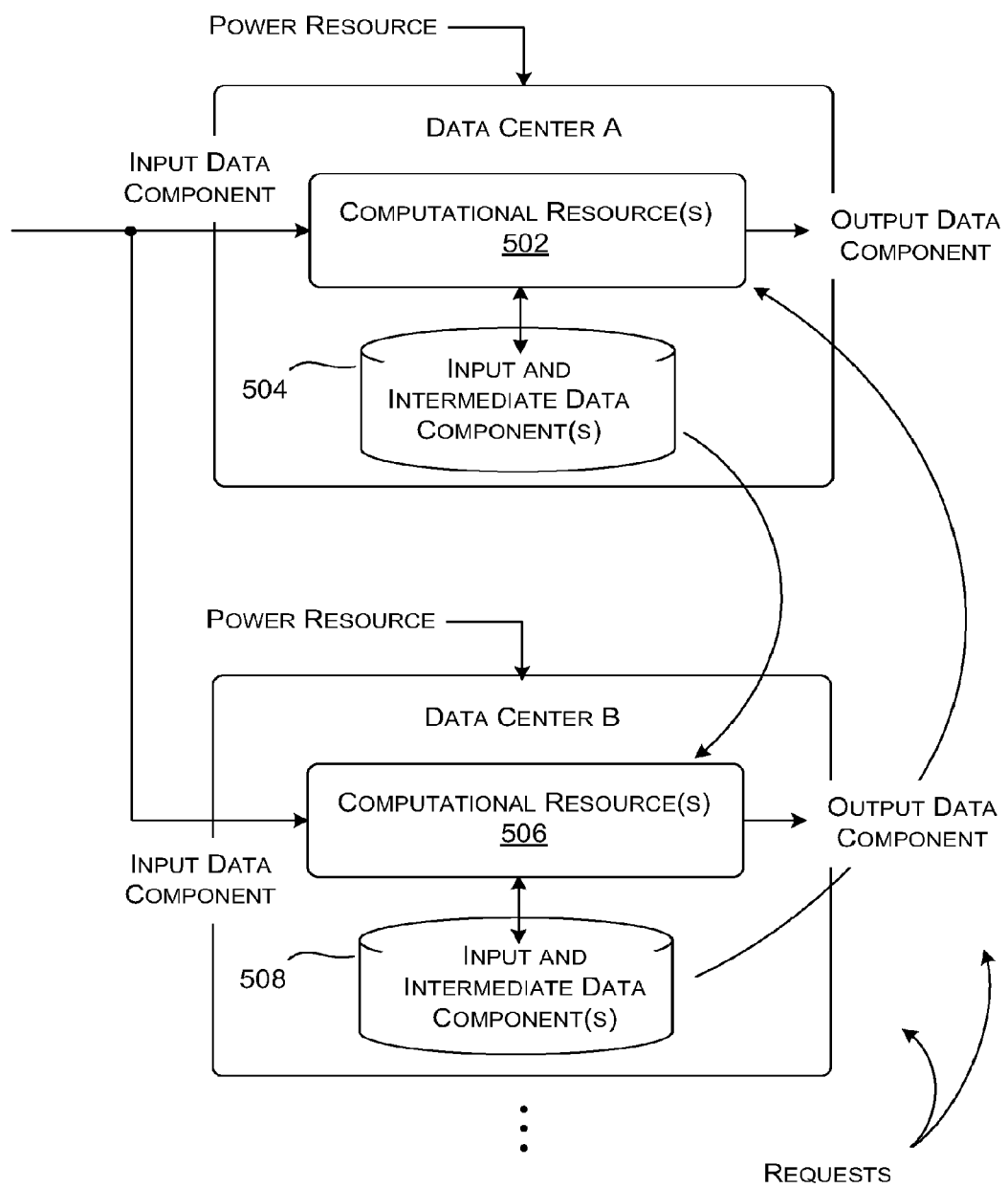
FIG. 5 shows an example of an information inventory paradigm that the management system (of FIG. 1) can use to govern the execution of processing tasks within the data center system.

FIG. 5 shows an example which demonstrates how the management system 120 can apply the above-described manufacturing paradigm to the processing of computational tasks. This figure shows two data centers, namely data center A and data center B, although the paradigm can apply to any number of data centers. Data center A provides computational resources 502 and one or more data stores 504, while data center B provides computational resources 506 and one or more data stores 508.

As shown in FIG. 5, a computational resource receives an input data component. The input data component represents whatever input information and program state information is used to perform a computational task. Each data center also receives a power resource from one or more power sources. The computational resource then transforms the input data component and the power resource into an output data component. The output data component represents whatever output result is generated by the computational task. Along the way, the computational resource may temporarily cache the input data component and one or more intermediary data components. An intermediary data component represents partial results that the computational task uses in the course of providing the final output data component.

In terms of process flow, the management system 120 can determine, based on any combination of factors, what target data center (or centers) is to receive an input data component, where that input data component is associated with a computational task to be performed. The management system 120 can then forward the data component to that data center (or data centers). Any recipient data center can then strategically determine the timing at which a computational task is to be performed, e.g., by executing parts of the computational task in advance and delaying the execution of other parts. Further, any recipient data center can transfer input data components and/or intermediate data components to other data centers, and vice versa. The management system 120 can also control the overall scheduling of applications, where each application involves the execution of one or more data components.

The management system 120 can govern the flow of data components within the data center system by considering multiple factors. For example, the management system 120 can determine the suitability of different data centers for handling a particular type of data component. The management system 120 can then direct the data component to the data center (or centers) that has the appropriate functionality for operating on the data component.

The management system 120 can also govern the flow of data components based on multiple cost factors. For example, the management system 120 can consider the different costs of processing a computational task by different data centers at different times, which may depend, in part, on the nature of the power sources that are available to the data centers at different times. These costs may also depend on the capabilities of the equipment used in different data centers. For example, some data centers may include functionality that offers better performance than other data centers, e.g., by consuming less power and/or time. For example, static-state storage devices offer better access-time performance compared to hard-drive mechanisms, but static-state storage device are more expensive than hard-drive mechanisms. There are also access-time differences among different types of hard-drive mechanisms. Further, newer processors may consume less power than older processors, and so on.

Second, the management system 120 can consider the bandwidth cost of transferring a data component between data centers. Third, the management system 120 can consider the costs of storing and retrieving an intermediary data component. These inventory-related costs involve the upfront costs of providing infrastructure to carry out these operations, as well as the latency-related costs of performing these operations. In addition, these inventory-related costs include the risks that the intermediary data components will become out-of-date (e.g., "stale"), and therefore useless.

To carry out these cost analysis and management functions, the management system 120 can rely on various types of operations research tools (such as various types of scheduling tools, various types of inventory management tools, etc). The management system 120 can also rely on any type of solving technique, such as an approximate dynamic programming technique, a mathematical programming technique, etc.

Advancing to FIG. 6, this figure shows management functionality 602 that can be implemented by the management system 120 of FIG. 1. This figure also shows data center functionality 604 that can be implemented by any data center in the data center system 102. Other data centers can implement an identical or similar architecture, although not shown. However, this division between the management functionality 602 and data center functionality 604 is illustrative of only one implementation. In another case, one or more aspects of the management functionality 602 can be incorporated into individual instances of the data center functionality 604.

Addressing the features of FIG. 6 from top to bottom, the management functionality 602 includes a price determination module 606. This module computes prices to be charged to entities for performing computational tasks. The prices take into consideration the fact that different data centers may, at any particular time, have different available power capacities, types, and costs associated therewith, as well as other functional characteristics. The next section (Section B) provides examples of price determination modules that can be used to compute the prices.

The management functionality 602 can also include a power assessment module 608. The power assessment module 608 determines the availabilities, costs, and other characteristics of various power sources at each data center. The power assessment module 608 can make this determination based on real-time information provided by the data centers, e.g., based sensor information provided by the data centers. Alternatively, or in addition, the power assessment module 608 can make this determination using prediction functionality. For each data center, the prediction functionality can predict power source availability (and cost) by identifying and analyzing patterns (e.g., trends) of availability (and cost) actually exhibited by the data center on past occasions. The prediction functionality can also identify and apply factors which have a bearing on power source availability and cost, such as time-of-day information, day-of-week information, seasonal information, special event information, weather information, and so on. In an alternative implementation, each data center can perform its own local power availability assessment, which it can then forward to the management system 120.

The management functionality 602 can also include a workload assessment module 610. The workload assessment module 610 makes a determination of amount(s) of power that are needed to execute a computational task. The workload assessment module 610 can also make a determination of the ability of different data centers to satisfy the workload. For example, assume that an entity requests x number of computational resources (e.g., x number of CPUs, x number of virtual machines, etc.). The workload assessment module 610 can convert this request into a resultant power expenditure, and then compare this power expenditure with an amount of power that is available at a particular data center, to thereby determine whether that data center is a suitable candidate for performing the computational task. In addition, the workload assessment module 610 can determine the types of resources that are demanded by the computational task (e.g., the types of processing, storage, and/or bandwidth resources). The workload assessment module 610 can then determine whether the candidate data center possesses this functionality. Generally, to make these decisions, the workload assessment module 610 can receive information from the data centers, as well as information provided by various management-level analysis modules. In an alternative implementation, each data center can perform its own local workload assessment, which it can then forward to the management system 120.

The management functionality 602 also can include a temporal movement determination module 612. The temporal movement determination module 612 determines whether a particular processing task can be broken down into plural data components, and whether some of those data components can be performed in advanced or delayed fashion (while being in conformance with SLA information associated with the computational task). The advanced or delayed processing can be performed at a local data center (where the data component exists at a current point in time) or at one or more remote data centers. For example, if a computational task includes plural discrete separable tasks, and the SLA information provides no timing-related constraints that would preclude advanced or delayed computation, then the temporal determination module 612 can determine that it is possible to distribute the computational task over time.

Generally, to make these decisions, the temporal movement determination module 612 can receive and analyze information regarding the characteristics of an individual application under investigation. The temporal movement determination module 612 can also receive and analyze information from the data centers (e.g., as gleaned from sensor information or the like) pertaining to the current operational states and characteristics of the data centers. The temporal movement determination module 612 can also receive and analyze information provided by various management-level analysis modules. For example, the temporal movement determination module 612 can, in part, base its conclusions on historical information. For example, the historical information may reveal telltale patterns or trends associated with the effective use of temporal data movement. The temporal movement determination module 612 can match factors associated with its present processing environment against factors within the historical information to predict whether movement is appropriate at the present time. In addition, or alternatively, the temporal movement determination module 612 can make and apply predictions regarding future supply and demand to determine whether it is appropriate to move a data component in the temporal dimension. In an alternative implementation, each data center can perform its own local temporal movement analysis, which it can then forward to the management system 120.

As a component thereof, the temporal movement determination module 612 can include a suspend and resume (S & R) module 612'. The S & R module 612' determines whether it is appropriate to suspend the execution of a data component, and then, later, whether it is appropriate to resume execution of the data component at a local data center or some other (remote) data center. The S & R module 612' can reach its conclusion based on any factor(s) identified above, e.g., based on information regarding the application itself, information regarding the characteristics of the data centers, information regarding historical patterns, information regarding predicted supply and/or demand, etc.

The management functionality 602 also can include a spatial movement determination module 614. The spatial movement determination module 614 determines whether a particular processing task can be broken down into plural data components, and whether some of those data components can be transferred to other data centers, or more generally, to other location(s) in the same data center and/or to other location(s) in other data center(s) (while being in conformance with SLA information associated with the computational task). As described in Section C, the spatial movement determination module 614 can use multiple factors in determining whether to move a data component, and if so, where to move the data component. One factor is the different costs for performing computations at different data centers, which, in part, may depend on the availabilities and types of power sources at those data centers. In brief, in one paradigm, the spatial movement determination module 614 can move the data component to the site (or sites) having the lowest cost(s).

Generally, to make these decisions, the spatial movement determination module 614 can receive and analyze information regarding the application under investigation, information regarding the operational states and characteristics of the data centers, and/or information provided by various management-level analysis modules. For example, the spatial movement determination module 614 can base its analysis, in part, on the same type of pattern-based and predictive analysis provided by the temporal movement determination module 612 (described above). In an alternative implementation, each data center can perform its own local spatial movement analysis, which it can then forward to the management system 120.

When performing analysis on an application, the temporal movement determination module 612 and the spatial movement determination module 614 can attempt to identify data components that can be decoupled from other data components within the application, e.g., based on any type of program dependency analysis. A developer can also purposely design an application to render its parts more readily separable, and thereby to leverage pre-computation, delayed computation, and/or data migration. Further, the developer can expressly designate parts of the application that can be subject to pre-computation, delayed computation, and/or data migration. This metadata helps the temporal movement determination module 612 and spatial movement determination module 614 in parsing the application into separable data components.

The data center functionality 604 includes computational resources 616. These computational resources 616 may correspond to a collection of server computers and associated data stores. The computational resources 616 can be organized into a plurality of racks.

The data center functionality 604 also includes a storage and retrieval module 618 for storing information in a data store 620 and for retrieving information from that data store 620. For example, the storage and retrieval module 618 can be used to store the results of pre-computation (referred to herein as intermediary data components). The storage and retrieval module 618 can then retrieve the intermediary data from the data store 620 at an appropriate juncture in the processing.

Finally, the data center functionality 604 can also include temporal movement execution module 622, a migration execution module 624, and a de-allocation module 626. The temporal execution module 622 carries out the mechanics of pre-computation or delayed computation. A suspend and resume (S & R) subcomponent 622' caries out the mechanics of suspending and resuming computation. In one case, the S & R modules (612' and 622') can provide functionality that is platform-independent, meaning that it can be applied to different types of data center infrastructures. The migration execution module 624 carries out the mechanics of data migration. The dc-allocation module 626 de-allocates computational resources that have been designated for shutdown, e.g., because they have failed, etc.

Figure 7:
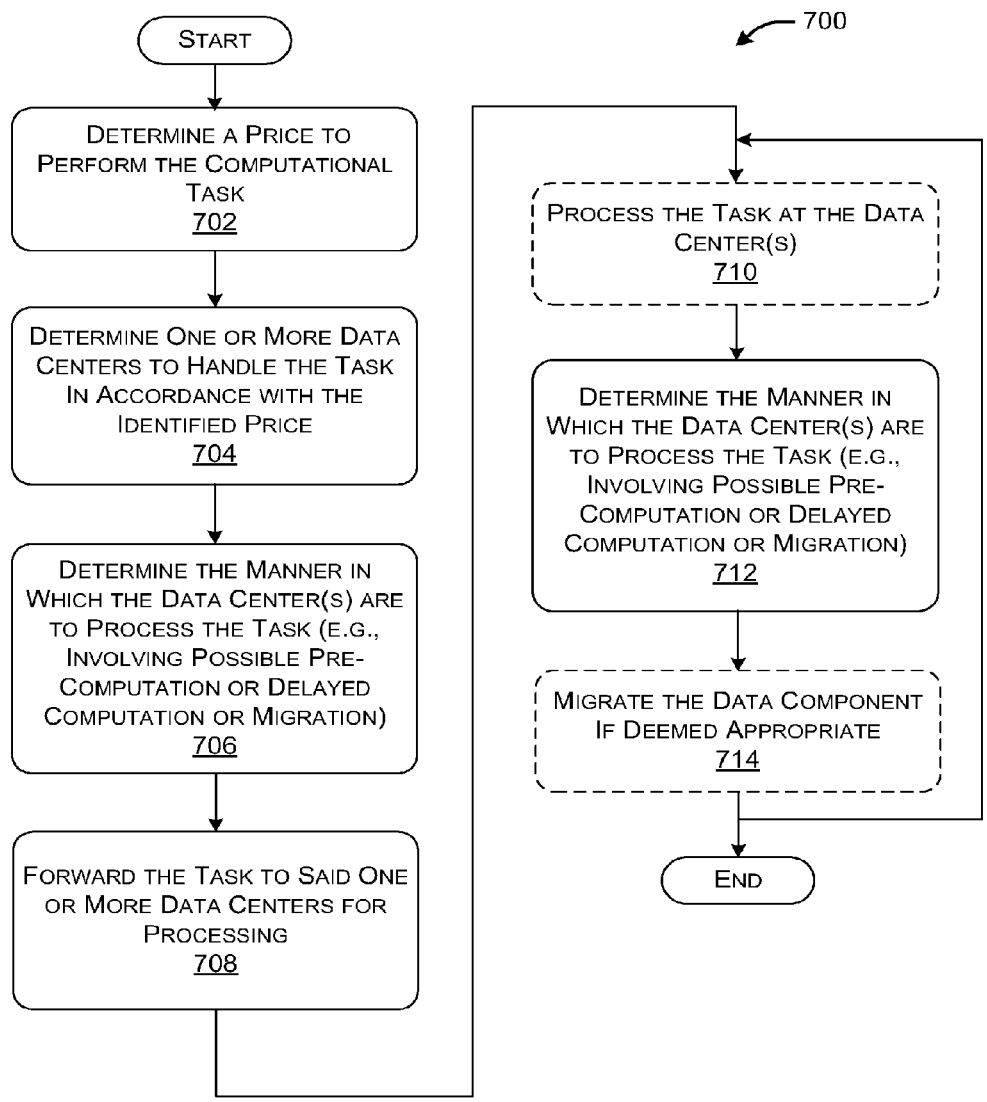
FIG. 7 shows is a flowchart which sets forth one manner of operation of the data center system of FIG. 1.

To close this introductory section, FIG. 7 shows a procedure 700 which represents one manner of operation of the data center system 102 of FIG. 1. Since the principles underlying the operation of the data center system 102 have already been described, certain operations will be addressed below in summary fashion. This procedure 700 is explained in the context of an illustrative computational task. The ordering of operations shown in FIG. 7 is merely representative; other scenarios may adopt other ordering of operations.

In block 702, the management system 120 can determine a price to perform the computational task. The next section will elaborate on different techniques to perform this function. In block 704, if the entity accepts the price, the management system 120 can determine one or more data centers to perform the computational task. Block 704 may involve analyzing the available power capacities and other operational characteristics of various data centers in view of the SLA information associated with the computational task. In block 706, the management system 120 determines whether it is appropriate to perform temporal movement and/or spatial movement in the course of processing the computational task; if so, block 706 involves setting up this manner of processing. Temporal movement can involve pre-computation, delayed computation, suspended computation, and/or the resumption of previously suspended computation. In block 708, the management system 120 forwards the computational task to the chosen data center(s) for processing in accordance with the processing plan set forth in block 706.

In block 710, the chosen data center(s) process the computational task in the manner determined in block 706. In block 712, the management system 120 and/or the data center again determines whether it is appropriate to perform temporal movement and/or spatial movement. Temporal movement can involve pre-computation, delayed computation, suspended computation, and/or the resumption of previously suspended computation. In block 714, if a decision has been made to migrate a data component, the data center transfers the data component to another data center. If a decision has been made to perform temporal movement, then the data center likewise carries out this activity. FIG. 7 shows a loop which indicates that the operations shown in block 710-714 can be repeated until the processing task is completed. These operations are repeated because the power capacity may change in an unexpected manner, making it appropriate to change the manner in which the computational task is handled.

B. Illustrative Pricing Functionality

Figure 8:
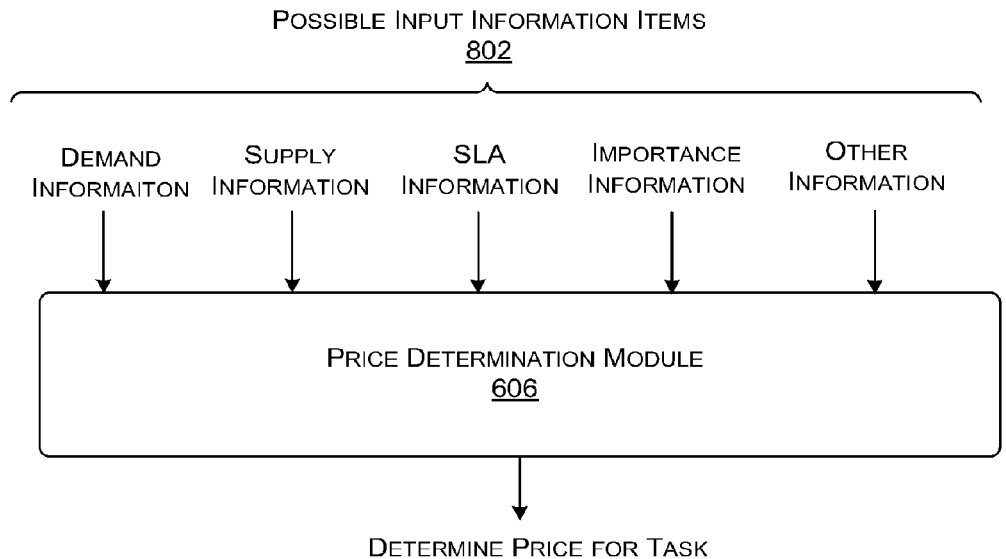
FIG. 8 shows an overview of a price determination module that can be used in the management system of FIG. 6.

FIG. 8 shows an overview of the price determination module 606 of FIG. 6. To repeat, the price determination module 606 determines prices for performing computational tasks in the data center system 102 in a manner that depends, in part, on the variable availability of power sources. This section begins by describing different possible features of the price determination module 606 that any implementation of that module can incorporate. The section then closes by providing examples of particular pricing models that incorporate some of the individual features.

To begin with, the price determination module 606 can receive any combination of input information items 802. For instance, the input information items 802 can include demand information and supply information. The demand information reflects the demand for particular computational resources at particular times. The supply information reflects the availability of the computational resources at particular times. The supply information, in turn, is based at least in part on the availability of power at particular times from different power sources, as well as the characteristics of those power sources.

The input information items 802 can also include Service Level Agreement (SLA) information that describes the manner in which the data center system 102 is requested to perform a computational task. For example, the SLA information can specify the nature of resources that are requested by an entity to perform a task (such as processing resources, storage resources, bandwidth-related resources, and so on). Further, the SLA information can specify an amount of work that the requested resources are asked to perform.

In addition, or alternatively, the SLA information can provide performance information. For example, the performance information can specify at least one throughput metric, such as a number of transactions requested per second. The performance information can also specify at least one latency metric. For example, in one case, the latency metric can specify an intra-center response time, e.g., by specifying how much time is permitted to process a task within a data center. Or the latency metric can specify an end-to-end response time, e.g., by specifying how much time is permitted between the submission of a task and the receipt a response following the execution of the task. In addition to delays within a data center, the end-to-end latency metric encompasses network delays between the submitting entity and the data center, and between different data centers (if, in fact, data migration is performed in the course of executing the task). The end-to-end latency metric therefore has a particular bearing on whether or not data migration can be performed using a particular remote data center, while still meeting the SLA information. That is, if inter-center network costs are too high, then data migration may not be feasible.

The performance information can also include at least one reliability metric. For example, a reliability metric can demand a certain level of availability of the requested resources, expressed in any environment-specific manner. In addition, or alternatively, the reliability metric can demand a certain level of error-free performance from the requested resources, expressed in any environment-specific manner.

Some applications, such as batch-oriented applications, may stress throughput requirements over latency issues. For example, these are applications that may involve the processing of a bulk amount of data within a prescribed time interval. Other applications may stress latency requirements over throughput issues. For example, these are applications that may involve interaction with an entity in a manner that satisfies a prescribed responsiveness. Other applications may stress both throughput and latency requirements.

These examples are representative rather than exhaustive; an entity can place any demands on the manner in which the data center system 102 is asked to execute a computational task. In one case, the management system 120 receives express SLA information from an entity which accompanies a computational task and which is separate from the computational task. Alternatively, or in addition, the management system 120 can infer the SLA information based on the characteristics of the computational task itself, e.g., by inferring the requirements of an application.

Further, in one case, an entity can specify SLA information in a data-center-agnostic manner. The management system 120 can then provide whatever data center resources are appropriate to satisfy the entity's requests. Alternatively, or in addition, an administrator of the data center system 102 can notify the entity of different characteristics of different data centers. The entity can then formulate SLA information which makes demands on a particular data center (or centers).

In addition, the input information items 802 can include any type of importance information which gauges a level of importance which the entity assigns to an application, e.g., in addition to the above-described performance metrics. In one case, the entity can specify the importance information as a component of the SLA information. In another case, the entity can specify the importance information via other means. For example, the entity can select one among a set of pricing options (to be discussed below). Based thereon, the price determination module 606 can infer the importance that the entity places on the execution of an application.

These information input items are representative, rather than exhaustive. The price determination module 606 can accept and process other types of information input items, such as time-of-day information, etc.

The price determination module 606 can provide any combination of rules and paradigms to determine the prices based on the collected input information items 802. The following explanation provides examples of these rules or paradigms. Different pricing models can incorporate one or more of these individual features.

a) The Pricing can Directly and/or Indirectly Consider the Characteristics of Power Sources From a high-level standpoint, the price determination module 606 can provide context-dependent pricing for its services based on a number of factors pertaining to the use of plural power sources, or, more generally, the use of different computing sites that may rely on different power sources. These factors may take into consideration any characteristic(s) of the power sources, such as the availabilities (and capacities) of the power sources, the locations of the power sources, the types of the power sources, the performances of the power sources, the costs of the power sources, and so on.

In one approach, the price determination module 606 provides pricing that depends on the types of power sources that are implicitly or explicitly permitted to be used. For example, the price determination module 606 can charge a lowest price for computation that relies entirely on renewable local power sources. That is, with reference to FIG. 4, for example, for location X, the price determination module 606 may charge the lowest price for renewable off-grid power sources that are provided at location X. As described above, this choice of power source has a number of constraints. An application which uses this price level cannot execute a computational task in the down-time of the power source(s), unless some strategy can be employed to perform advance computation or delayed computation.

The price determination module 606 can charge an intermediate price for computation that relies on any renewable power source, including remotely located power sources. An application which uses this price level may incur some latency-related cost caused by the transfer of data components from one location to another.

The price determination module 606 can charge the highest price for computation with associated high performance demands, such as computation that demands low latency and/or high availability. By virtue of these demands, such a computation may preclude temporal and/or spatial data movement. An application that uses this price level may, at times of inadequate renewable power, be forced to rely on the grid-based utility capacity 314, since this is the only power source that guarantees continuity.

In the above example, in one implementation, an entity can indirectly convey its power source preferences via constraints specified in its SLA information. For example, an entity may specify liberal (or no) performance constraints in its SLA information, which qualifies it for the lowest price. By contrast, an entity may specify relatively strict performance requirements, which mandates the use of the utility power source; the entity therefore also incurs the higher costs associated therewith. In other words, in one implementation, the price determination module 606 can map the SLA requirements into power source requirements (or, more generally, data center requirements), and then can map the power source requirements into a price offering. For example, an entity which demands that computational resources are (almost) always available to meet its requests can be expected to pay a relatively high price for that level of service. Similarly, an entity which demands very quick answers to its requests can also be expected to pay a relatively high price for that level of service. Alternatively, or in addition, an entity may specify express instructions that establish what processing location(s) are considered permissible and/or what power source(s) are considered permissible. The entity can specify these instructions in terms of preferences (with weights optionally associated therewith) and/or mandates.

In addition, the price determination module 606 can define prices in a more fine-grained and dynamic manner by assessing: a) the timing at which the entity wishes to perform a computation; and b) what power sources are available pursuant to this timing. For example, with reference to FIG. 4, assume that a consuming entity stipulates that its processing task is to be performed immediately and with a low degree of latency. This specification may preclude temporal movement or spatial movement. To address this situation, the price determination module 606 can apply a first pricing model 416 to this job. In this model, the price determination module 606 may quote a relatively high price if the entity requests the computational task to be performed during a period of low power availability, such as when renewable power generation is low. In contrast, the price determination module 606 may quote a lower price if the entity requests the computational task to be performed at a time of relatively high power availability.

Assume next that another consuming entity permits temporal movement and/or spatial movement to be used in the course of executing a computational task. The price determination module 606 can use a second pricing model 418 to assign prices to this job. As shown, the price determination module 606 may quote a relatively low price regardless of when the entity requests the computational task to be performed, since different resources can be flexibly leveraged to address the computational task. In other words, in the second pricing model 418, the prices do not have dramatic variations, as in the first pricing model 416.

B) The Pricing can Take Account of Usage Information

According to one feature, the price determination module 606 can use, in part, any combination of usage-based criteria to determine pricing. For instance, the price determination module 606 can base its pricing on the number of CPUs or virtual machines (VMs) or application instances that will be used by a computational task, together with the amount of time that these resources will be used. Alternatively, or in addition, the price determination module 606 can base its pricing on the amount and nature of inter-component messages invoked by a computational task. That is, the price determination module 606 may charge a higher cost for messages sent between different data centers, compared to messages sent between components within a single data center.

c) The Pricing can Take Account of Urgency Information

To repeat, the price determination module 606 can base its pricing, in part, on the urgency associated with a computational task. This is because, in an episodic environment, the level of urgency may mandate the use of certain data center(s), each powered by one or more power sources having prescribed costs associated therewith. For example, the price determination module 606 can base its pricing, in part, on the requested latency associated with a computational task. Alternatively, or in addition, the price determination module 606 can charge different rates to an entity depending on whether the entity requests computational results within one hour, within one day, or within one week, and so on. An entity can either explicitly or implicitly convey the urgency associated with a computational task.

d) The Pricing can Take Account of Supply and Demand Information

According to another feature, the price determination module 606 can base its pricing, in part, on supply and demand information. For example, in one case, the price determination module 606 can assess supply and demand information based on any current evidence of present supply and demand (e.g., based on any information regarding the current availability of power sources at different data centers). In addition, or alternatively, the price determination module 606 can assess supply and demand information by analyzing and extrapolating prior recorded instances of supply and demand.

e) The Pricing can be Determined by Auction-Based Mechanisms

According to another feature, the price determination module 606 can set prices using any type of auction functionality. For example, the price determination module 606 can apply a non-combinatorial auction or a combinatorial auction. In a combinatorial paradigm, the auction functionality can allow entities to bid on combinations of computing resources, such as any bundling of processing resources, storage resources, bandwidth resources, and so on. In a non-combinatorial auction, the entity may bid on single items, such as processing capacity by itself.

According to another feature, the auction functionality can rely on a Vickrey-type paradigm. This type of model assigns prices based on the second-highest-bid submitted to the auction functionality.

According to another feature, the auction functionality can determine prices for all (or a significant portion) of the computational resources associated with the data center system 102. Alternatively, the data center system 102 can use a main allocation paradigm to allocate resources in the data center system 102, leaving a certain amount of unallocated remnant resources. The auction functionality can then determine prices for the remnant resources.

These auction paradigms are representative rather than exhaustive; the price determination module 606 can rely on yet other types of auction functionality.

f) The Pricing can Attempt to Achieve a Desired Degree of Resource Utilization

According to another feature, the price determination module 606 can set prices in such a manner that all of the computational resources within a data center are used up (to the extent possible). In other words, the price determination module 606 attempts to avoid idle computational resources because such idle resources contribute to loss of profits.

g) The Pricing can Provide Strategic Management of SLA Requirements

According to another illustrative feature, the price determination module 606 can provide computational resources which satisfy SLA requirements, but do not provide performance which exceeds the SLA requirements. For example, assume that an entity specifies a desired latency of X units of time. The price determination module 606 can provide computational resources which meet that desired latency, but do not achieve any latency that is less than X units of time. This may mean that the data center system 102 may use a remote data center to perform a computational task, even though the data center system 102 could have used available local resources to perform this task. As a result of this approach, the price determination module 606 can dedicate higher-performing computational resource to entities which specifically request these resources. This feature, in turn, can help maximize profits for the data center system 102 in some instances and/or reduce carbon emissions associated with the use of the utility base capacity.

h) The Pricing can Provide Multiple Options to Users

According to another illustrative feature, the price determination module 606 can, in one instance, determine and post the prices for performing a computational task at each of a plurality of time instances t within a time horizon, e.g., throughout the day. This approach is referred to herein as a per-instance pricing scheme. An entity can then accept one of these prices (and an associated time instance) that is deemed to satisfy its processing requirements. The data center system 102 can then process the entity's request, e.g., by performing the computational task at the selected time instance and at the corresponding price.

In another case, the price determination module 606 can post plural contracts for consideration by the entity. Each contract lists a price for an associated level of service (beyond merely promising to perform the computational task at a particular time instance). This approach is referred to herein as a per-contract pricing scheme. For example, a first contract can identify a first price for a first latency performance and a second contract can identify a second price for a second latency performance. In a related scenario, each contract may stipulate that a computational task will be accepted by the data center system 102 at a time instance i and the results of the computational task will be returned at a time instance j, for a given price. More specifically, in one case, the data center system 102 will return the results at time instance j even if they are available before the time instance j.

Figure 9:
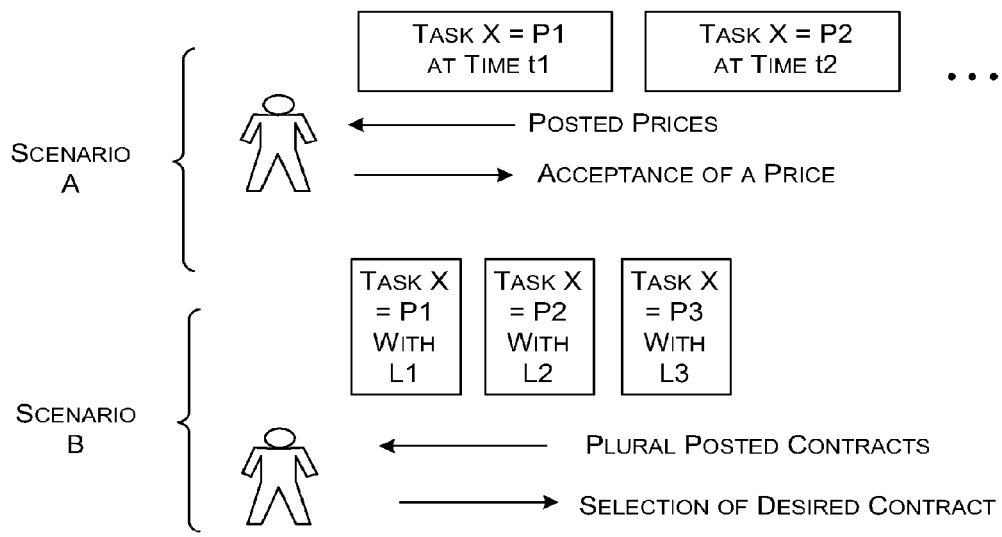
FIG. 9 shows different approaches for communicating prices to entities using the price determination module of FIG. 8.

FIG. 9 provides a graphical illustration the above-described two modes of operation. In scenario A (the per-instance pricing scheme), the price determination module 606 provides a posted price for each time instance t on a take-it-or-leave-it basis, with no other service level commitments associated therewith. In scenario B (the per-contract pricing scheme), the price determination module 606 provides plural contracts having different prices and latencies (or other service level commitments) associated therewith.

The price determination module 606 can adopt a multi-contract strategy for at least two reasons. First, the strategy provides the entity with multiple options, therefore making it more likely that the entity will find a price which meets its particular needs. Second, the strategy provides an incentive for the entity to communicate its true needs to the price determination module 606, as will be set forth in greater detail below.

i) The Pricing can Attempt to Direct the Behavior of the Entities

The price determination module 606 can set prices which encourage desired behavior by entities that interact with the data center system 102. For example, consider the case of entities who develop applications for execution in the data center system 102. If possible, these entities can write the applications in such a manner to accommodate temporal data movement and/or spatial data movement, with the objective of securing reduced prices when the applications are run in the data center system 102.

Consider next the individuals who submit (or otherwise identify) the applications for execution in the data center system 102. These entities can specify SLA information or the like which accommodates temporal data movement and/or spatial data movement when deemed appropriate, again attempting to secure reduced prices when the applications are run in the data center system 102.

More generally stated, the prices can encourage the individuals to make decisions which result in data being moved to locations (and/or time periods) at which power is efficiently priced. The prices, effectively, can be said to move the data. The prices can also be said to complement the use of renewable and potentially off-grid power sources, which offer episodic performance. This is because the prices encourage data movement when appropriate, and thereby effectively complement the dynamic nature of power availability within the data center system 102.

More specifically, the prices can sometimes allow entities to make informed tradeoffs between different objectives. In one case, for instance, the price determination module 606 can assign different prices for different performances. An entity can determine whether a lower price is worth a somewhat degraded performance.

Further, in the case of the per-contract pricing scheme, the price determination module 606 defines the prices in such a manner that the entities are encouraged to accurately convey the nature of their resource needs. This will prevent entities from "gaming" the data center system 102. For example, assume that an entity is actually willing to wait an entire week to receive a computational resource. Hence, the entity may wish to select a pricing option that specifies an ij time segment of i=Monday and j=Friday, at a specified cost. But if the entity notices that a time segment from Wednesday to Friday has a lower cost, the entity will opt to select that time segment, even though this timeframe does not actually reflect the true level of urgency of his or her task. The price determination module 606 selects the prices to rule out these types of gaming decisions, and thereby incentivize the entities to accurately convey their resource needs. This feature, in turn, results in efficiencies that confer benefits to both the entities and the data center system.

j) The Pricing can Take Account for the Manner in which an Application Leverages Data Movement As described above, an application can have multiple data components that perform multiple respective subtasks. The management system 120 can determine that some of the data components can be decoupled from others. Further, the management system 120 can determine that some of the data components can be performed in advance, and/or some of the data components can be performed in delayed fashion, and/or some of the data components can be transferred to a remote data center (or centers). For example, a search engine application can include an updating operation that can be performed in advance to produce an updated index. The search engine application can also include a search operation that involves the real-time use of the updated index. This partitioning can be relatively static and/or dynamic. For example, in one static configuration, one or more data components of an application can be handled by a first data center (or centers) at a first location, and one or more other data components can be handled by a second data center (or centers) at a second location.

In one implementation, the price determination module 606 can associate different costs with different subtasks within an application (which may ultimately correlate to the use of different power sources having different costs associated therewith). The price determination module 606 can quote a single price for the application that takes into consideration the underlying costs associated with the different subtasks.

k) The Pricing can be Communicated to the User in any Level of Specificity

According to another feature, the price determination module 606 can communicate pricing options to the entity (e.g., user) in any level of specificity. In one case, the price determination module 606 can determine a price based on myriad factors, including SLA information, dynamic supply information, dynamic demand information, and so on. Yet the price determination module 606 may offer the entity a single price (or set of price options) that does not reveal the underlying factors associated with the single price. This simplifies the entity's consideration of the pricing proposal. In another case, for more sophisticated entities, the price determination module 606 can set forth the underlying basis of its pricing calculations. The price determination module 606 can communicate its pricing proposals in any manner, e.g., via targeted Email, via a posting to a network site, etc.

l) The Price Determination Module can Provide Itemized Billing

According to another feature, the price determination module 606 can provide an itemized bill to the entity at the end of a billing cycle, and/or upon request. That itemized bill can specify the resources that the data center system 102 has expended in the course of processing the entity's applications. The bill can itemize these expenditures in any manner, e.g., by specifying the types and amounts of resources that were consumed, the times at which those resources were consumed, the locations of the resources that were consumed, and the costs of the resources that were consumed, etc. The costs can be specified in any level of detail, e.g., by showing costs that were incurred at specified times. The bill also provides a useful vehicle for ensuring that the entity's SLA information has been satisfactory met.

Figure 10:
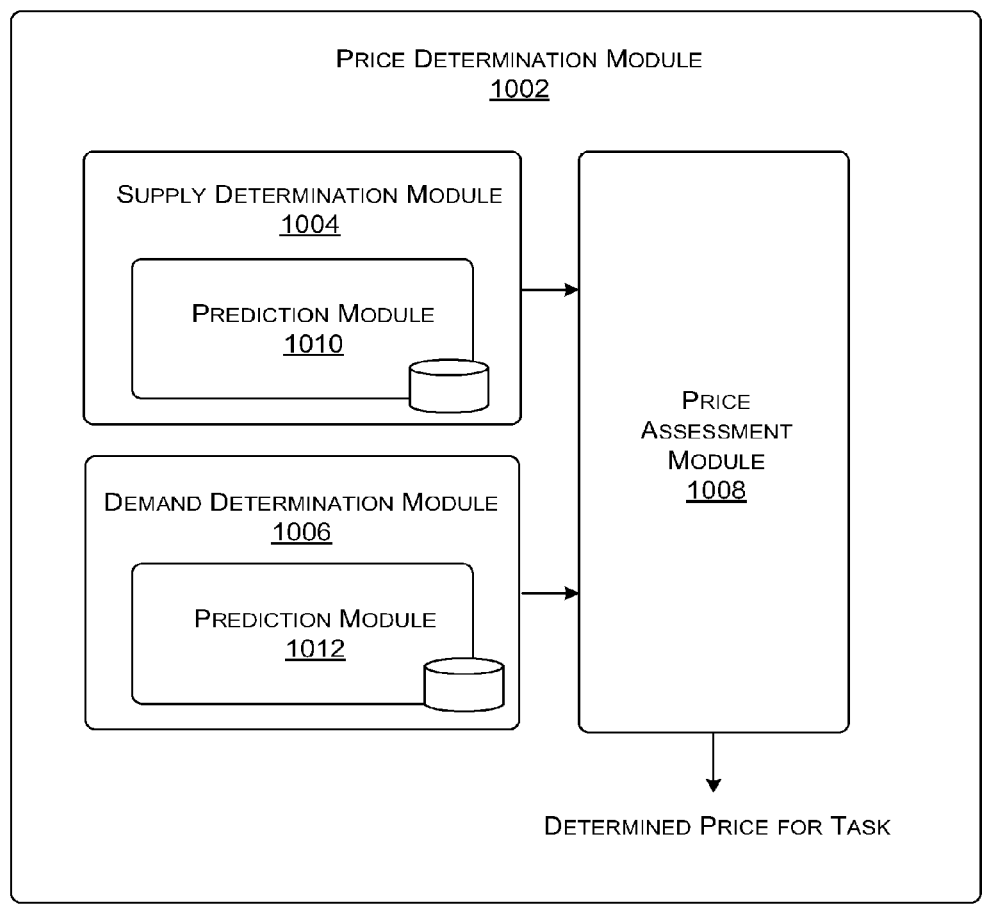
FIG. 10 shows one implementation of the price determination module of FIG. 8. This implementation computes prices for performing computational tasks based on analysis of supply and demand curves.
Figure 11:
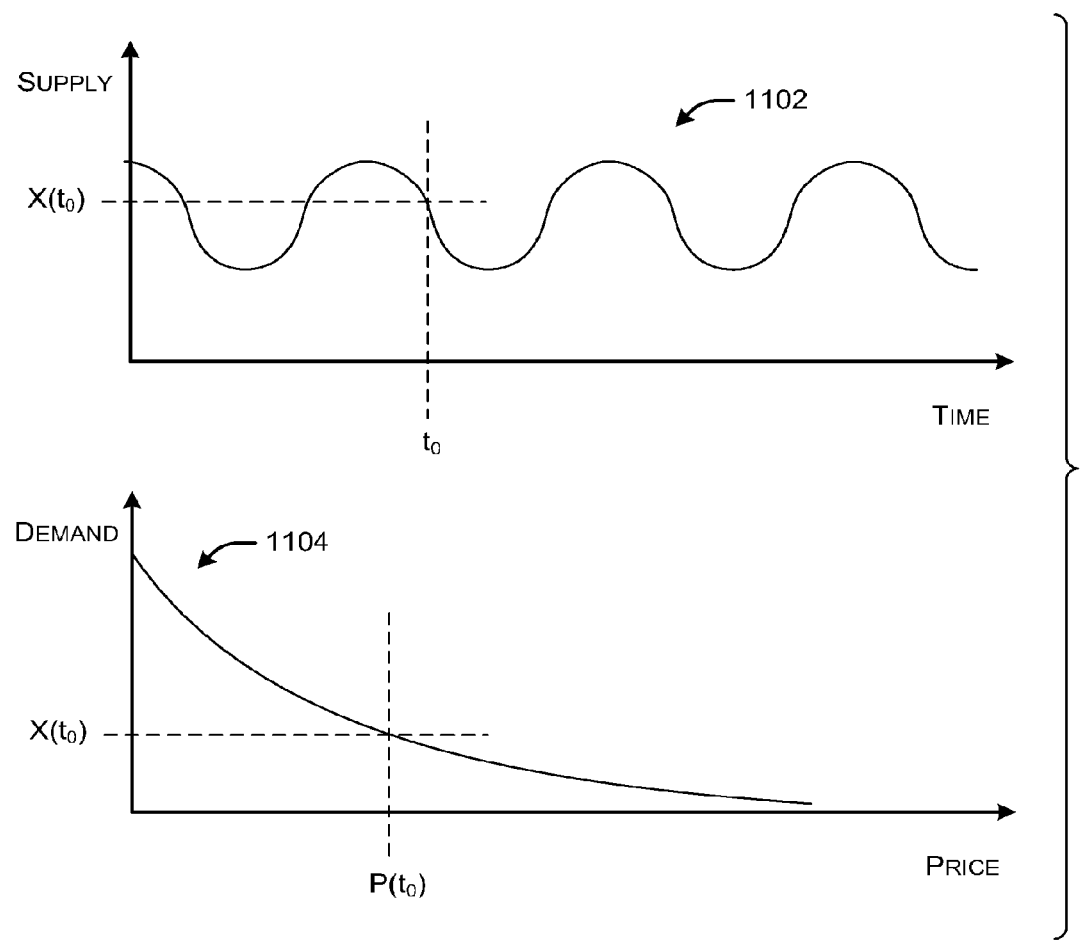
FIG. 11 shows an illustrative supply curve and an illustrative demand curve that can be used, in the implementation of FIG. 10, to determine a price for performing a computational task.

With the above discussion of individual features, this section closes with three examples of particular implementations of the price determination module 606. FIG. 10 shows a price determination module 1002 that represents a first implementation. This price determination module 1002 includes a supply determination module 1004 for determining an aggregate time-varying supply curve. For example, FIG. 11 shows one such time-varying supply curve 1102. The supply curve 1102 reflects the availability of a computational resource as a function of time. For example, the supply curve 1102 indicates that a supply of $X(t_0)$ is available at time $t_0$. In this example, the supply curve 1102 has a sinusoidal shape, indicating that it may correspond to a renewable power source (such as a solar power source). However, although not shown, the supply curve 1102 can also include non-periodic components attributed to non-periodic events, such as catastrophic events which affect capacity.

A demand determination module 1006 determines the overall demand for a computational resource and expresses it as an aggregate demand curve. That is, the demand curve quantifies how many entities would utilize the computational resource as a function of the price. For example, FIG. 11 shows one such time-varying demand curve 1104 for a particular time $t_0$. Although not shown, the demand curve can take into consideration both cyclical events (e.g., associated with periodic demand for resources over the course of a day) and non-cyclical events (e.g., based on network traffic associated with breaking news, computer viruses, etc.).

A price assessment module 1008 determines the price for the computational resource at time $t_0$ based on the supply curve 1102 and the demand curve 1104 (if, in fact, both of these curves are known). Namely, let $X(t_0)$ be the supply at time $t_0$ and let g( ) be the inverse demand function at that time. Then the price that equalizes demand to supply is given by $g(X(t_0))$.

In practice, both the supply and demand curves may be stochastic and unknown in advance. To address this situation, the supply determination module 1004 and the demand determination module 1006 can provide respective prediction modules (1010, 1012) to predict the supply and demand curves based on historical information. For the case of the supply determination module 1004, the prediction module 1010 can mine information regarding past availabilities and costs of various types of resources. A supply-related prediction can be used to estimate the availability of power (and other resources), the cost of power (and other resources), etc. For the case of the demand determination module 1006, the prediction module 1012 can mine information regarding past demand for various types of resources, and the prices paid for those resources. A demand-related prediction can be used to estimate the arrival of future jobs, the duration of the jobs, the occurrence of demand bursts, the occurrence of peak loads, etc. The price determination module 1002 leverages the predictions of the supply determination module 1004 and the demand determination module 1006 to determine the prices to be assigned to resources; moreover, as explained in Section A, the management system 120 also can use these predictions to determine the manner in which data components are moved within the data center system 102 in the temporal and/or spatial dimensions.

More specifically, in one illustrative implementation, the supply determination module 1004 and the demand determination module 1006 can provide one or more tools to approximate the supply and demand curves, providing a near-optimal price setting. For example, as stated above, the supply curve and the demand curve may include periodic components. The supply determination module 1004 and the demand determination module 1006 can leverage this characteristic by approximating the current supply and demand curves based on historical supply and demand data, e.g., by using any type of machine learning techniques.

For example, the price determination module 1002 can use supervised learning and regression algorithms for learning the functions associated with the curves based on historical examples. Alternatively, or in addition, the price determination module 1002 can use feature selection and principle component analysis (PCA) techniques to reduce the dimensionality of the learning problem and diminish the effect that "outliers" have on learning (where outliers correspond to non-standard behavior exhibited by supply or demand data). Alternatively, or in addition, the price determination module 1002 can use Fourier-based techniques for extracting the periodic components of the supply and demand curves, and so on.

As mentioned above, the supply and demand curves may also include non-periodic components. However, it is reasonable to assume that these curves evolve as a causal stochastic process, e.g., as a Markovian process. To address this situation, the price determination module 1002 can apply techniques from control theory for estimating the curves, such as a Kalman filter technique. The price determination module 1002 can also employ dynamic programming and other stochastic optimization techniques.

In the above example, the price determination module 1002 models supply and demand using a single supply curve and a single demand curve (for each particular instance of time). In many environments, however, entities have different characteristics and needs. For example, some entities place a higher demand on latency than others and are willing to pay the price to achieve low latency. To reflect this heterogeneity in needs, the price determination module 1002 can determine and post a set of different service class contracts. Each service class contract has a particular SLA characteristics and a commensurate price.

To take account for plural service classes, the supply determination module 1004 can determine plural supply curves associated with different service classes. Similarly, the demand determination module 1006 can determine plural demand curves associated with the different service classes. To further complicate this scenario, entities may migrate from their "dedicated" service class to another service class to take advantage of desirable prices associated with this other service class. To deal with these complexities, the price determination module 1002 can use a trial-and-error adaptive technique to estimate the prices. For example, the price determination module 1002 can vary the price by a small amount and then observe the resultant changes in demand; the price determination module 1002 can then compute the derivative of the change and use that information to adjust the price.

Figure 12:
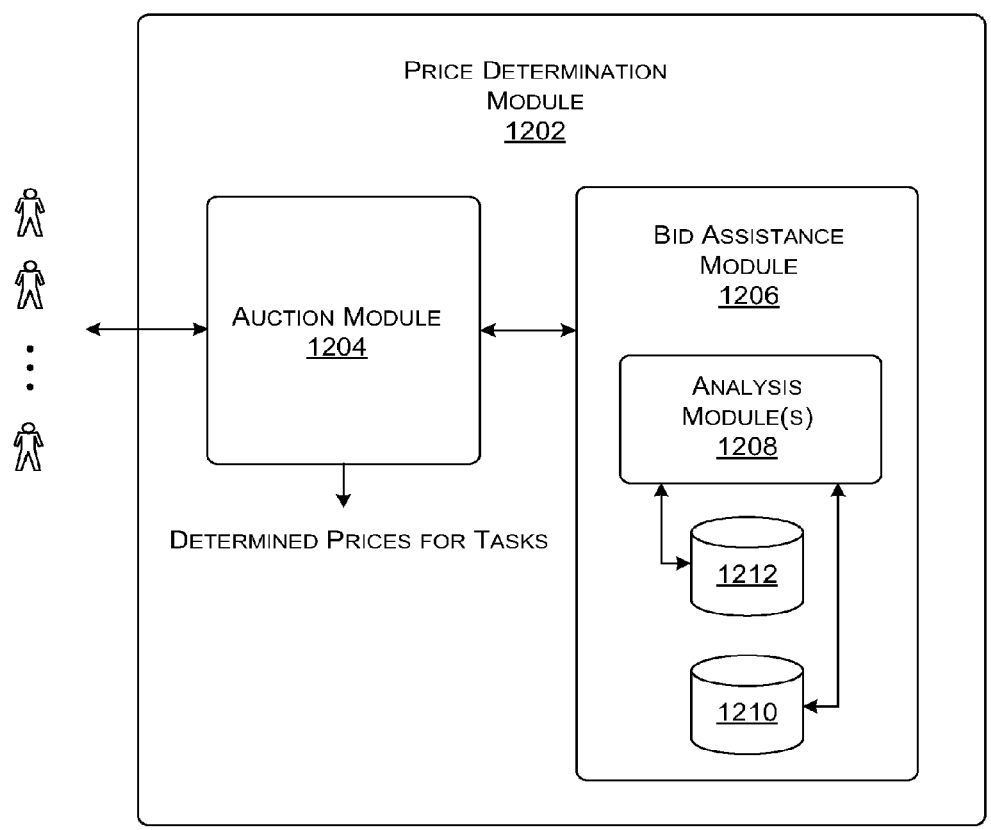
FIG. 12 shows another implementation of the price determination module of FIG. 8. This implementation computes prices based on auction functionality.

FIG. 12 shows another price determination module 1202. In this example, the price determination module 1202 includes an auction module 1204 for accepting bids from entities and for selecting prices based on the bids using any auction paradigm or combination of paradigms (such as a combinatorial auction paradigm, a Vickrey auction paradigm, and so forth). The auction module 1204 can also determine and apply a reserve price in the auction process. The auction module 1204 can compute the reserve price based on a consideration of previous bids.

Generally, the bidding process involves: (a) collecting bids from a group of entities using a bidding language (such as a combinatorial bidding scheme); (b) determining the availability of computational resources that satisfy the bids; (c) assigning prices to the computational resources based (in part) on the bids using any price-determination paradigm (such as the Vickrey paradigm); (d) communicating the prices to the bidding entities; and (e) providing computational resources to the entities which accept the prices.

The price determination module 1202 can also include a bid assistance module 1206. The bid assistance module 1206 provides an interface which helps an entity formulate its bid. The bid assistance module 1206 can perform this task by engaging in an interactive dialogue with the entity. In that dialogue, the bid assistance module 1206 can ask questions which solicit the resource needs of the entity, e.g., regarding the types, amounts, and performances of the resources that are desired. The entity responds by the supplying the requested information. To perform this task, the bid assistance module 1206 uses an analysis module 1208; the analysis module 1208 engages in a query-and-answer session, guided by dialogue information provided in a data store 1210.

After collecting information, the bid assistance module 1206 suggests a price that the entity may bid in an attempt to secure the desired resources. To perform this task, the bid assistance module 1206 attempts to determine the value(s) of the resources requested by the entity. More specifically, in one implementation, the analysis module 1208 predicts a viable price based on historical demand information and supply information provided in a data store 1212. The historical demand information and supply information encompass information regarding previous bidding activity.

According to another implementation, the price determination module 606 (of FIG. 6) can compute prices by formulating a weighted welfare function. The weighted welfare function includes a first component associated with consumer welfare (CW) and a second component (REV) associated with firm revenue. In one case, CW and REV can be expressed as:

$$CW_{ij}(p) = \int_p^1 (x-p) f_{ij}(x) dx, \text{ and}$$

$$REV_{ij}(p) = \int_p^1 p f_{ij}(x) dx.$$

Namely, $f_{ij}$ refers to the distribution of valuations for a population ij of entities. That is, the population ij corresponds to a group of entities that specify jobs having a deadline at time instance j relative to a request submission time instance i. The valuations reflect the importance (e.g., demand) that the entities in this population assign to their respective computational tasks. The symbol p refers to the price that the price determination module 606 will assign to the service provided by the data center system 102.

More generally stated, each entity receives a benefit that corresponds to the difference between his or her valuation (v) and the stated price (p). The consumer welfare (CW) component reflects a summation of these benefits conferred to the individual entities. The data center system 102 itself receives a benefit (expressed by the REV component) which directly corresponds to the number of entities who have purchased the service at price p. The weighted combination of CW and REV can be expressed as:

$$u_{ij\alpha} = \alpha REV_{ij}(p) + (1-\alpha) CW_{ij}(p).$$

In this equation, $u_{ij\alpha}$ refers to the utility provided to the population ij, and $\alpha$ refers to a weighting factor. The weighting factor $\alpha$ determines the influence of the REV component relative to the CW component. For $\alpha=1$, the price determination module 606 defines utility solely based on the revenue provided to the data center system 102. For $\alpha=0$, the price determination module 606 defines utility solely based on the benefit provided to the requesting entities. For $\alpha=0.5$, the environment 100 shown in FIG. 1 is managed according to a social welfare paradigm.

The price determination module 606 can then proceed to set up an optimization problem based on the above-indicated weighted welfare function, subject to relevant constraints. By solving this optimization problem, the price determination module 606 can provide the prices that can be charged to entities to optimize the performance of the data center system 102. More specifically, the price determination module 606 can formulate the optimization problem for different pricing scenarios, including the above-described per-instance pricing scenario, as well as the per-contract pricing scenario. The price determination module 606 can solve the optimization problem using different approaches, such as a mathematical programming technique, a dynamic programming technique, and so on. Additional details regarding one dynamic programming technique that can be used to determine prices can be found in co-pending and commonly-assigned application Ser. No. 12/903,227, filed Oct. 13, 2010, entitled, "Pricing Mechanisms for Perishable Time-Varying Resources," naming the inventors of Christian Borgs, et al., which is incorporated in its entirety herein by reference.

C. Illustrative Data Migration Functionality

To review, the spatial movement determination module 614 determines the manner in which computational tasks can be migrated among different data centers (if at all), or, more generally from a first location to a second location (within the same data center or between data centers). To perform this task, the spatial movement determination module 614 can rely on different techniques. To facilitate description, the following explanation will set forth the data migration functionality in the context of inter-center migration.

In a first technique, the spatial movement determination module 614 makes inter-center migration decisions primarily based on the criterion of power availability at different data centers. For example, the spatial movement determination module 614 can monitor the current capacities of power sources that are available at different data centers; that capacity information can be generally referred to as power information. The spatial movement determination module 614 can use this power information to match instances of deficient computational capacity with instances of adequate or overabundant computational capacity. For example, assume that a data center A is currently running an application using a renewable wind power source. Further assume that the power generated by the renewable power source decreases in capacity, e.g., because the wind stops blowing. The spatial movement determination module 614 can examine the power information to identify a data center at which renewable power sources are currently available. The spatial movement determination module 614 can then transfer one or more data components (that are associated with the application) to that location. If more than one data center has available resources, then the spatial movement determination module 614 can select the data center having the least expensive service. To the extent that such power loss can be predicted, the spatial movement determination module 614 can perform this transfer before the data center becomes effectively disabled.

In another case, the spatial movement determination module 614 can consider multiple factors in determining whether to transfer a data component to a particular data center. For example, the spatial movement determination module 614 can consider any one or more of: the availabilities of power provided at the data centers; the types of power provided at the data centers; the costs of power provided at the data centers; the costs of transferring the data component among the data centers, and so on.

In one approach, for example, the spatial movement determination module 614 can set up an optimization problem based on multiple factors. For example, the spatial movement determination module 614 can set up an optimization problem having the following formulation:

$$\min \sum_{i=1}^{n} \sum_{t=1}^{T} d_i z_{i,t} + \sum_{i=1}^{n} \sum_{t=1}^{T} C_{i,t}(y_{i,t}).$$

In this expression, the symbol $y_{i,t}$ refers to a number servers that are utilized in a data center i at time t. The symbol $C_{i,t}(y_{i,t})$ refers to a total cost of providing service at the data center i at time t. The symbol $d_i$ refers to bandwidth costs of moving a data component from data center i. The symbol $z_{i,t}$ refers to a number of data components migrated from data center i at time t. The inner summation in this equation is performed from time t=1 to time t=T. The outer summation is performed from data center i=1 to data center i=n.

In one implementation, various online optimization algorithms can be used to reformulate and solve the above-described optimization problem. An online algorithm refers to a technique for solving a problem in which the input data is provided in piecemeal fashion. The online algorithm offers a performance which can be assessed, via competitive analysis, relative to an offline algorithm (in which all of the input data is available for computation).

As a general feature, the above strategy takes into account the future consequences of job migration and the uncertainty associated therewith. This is in contrast to so-called greedy approaches which perform migration based on a consideration of the current availability and cost of energy sources (rather than future consequences).

Other implementations of the spatial movement determination module 614 can take into consideration other factors in determining when (and where) to migrate data components. For example, the implementations can take into consideration any one or more of the following supplemental factors.

a) Type of Resources.

The spatial movement determination module 614 can take into consideration the types of resources provided at different data centers, with respect to the demands placed on the resources by a particular application being analyzed. For example, a data center may be characterized by particular types and amounts of processing, storage, and bandwidth resources. The bandwidth resources can further be classified in terms of network connectivity within the data center and the ability of the data center to communicate with other data centers (e.g., over the Internet and/or other network connection).

These factors have a bearing on the suitability of the data center for handling a particular application in a particular way. For example, assume that a data center has relatively poor inter-center bandwidth resources. This means that this data center will be a poor candidate to choose for an application that demands significant inter-center data communication. Further, assume that the data center implements a particular type of connectivity, e.g., by providing a Clos topology, as opposed to a traditional spanning tree network, or vice versa. This means that the data center (which hosts a Clos topology) will be a good candidate for handling an application that demands the sorting of large data sets, compared to a data center that uses a spanning tree topology.

b) Age of Resources.

Related to the above point, the spatial movement determination module 614 can take into consideration the age of resources provided at different data centers, with respect to the demands placed on the resources by a particular application being analyzed. A data center may have a relatively low cost of energy, yet provide relatively old server equipment. That older equipment may consume more power than newer equipment, thus at least partially reducing the benefit of running an application at the site having a lower energy cost.

c) Carbon Footprint.

Different data centers may have different impacts on the environment. For example, different data centers may involve the consumption of fossil fuels to differing extents. These factors may or may not correlate with the pure monetary costs of running the data centers. The spatial movement determination module 614 can take such environmental costs into consideration when deciding when and where to migrate data components.

d) Power Usage Effectiveness (PUE).

Different data centers may offer different PUE performances due to myriad factors, such as the age of the data centers, the climates in which the data centers are located, and so on. The spatial movement determination module 614 can take such PUE considerations into account when deciding when and where to migrate data components.

e) Legal Considerations.

Appropriate governing authorities may place constraints on the geographical placement of computing tasks. For example, a country may demand that certain computational tasks be performed within its jurisdiction. The spatial movement determination module 614 can take such legal considerations into account when deciding when and where to migrate data components.

f) Competitive Considerations.

Competitors may seek to differentiate their services from others. For these reasons, these competitors may wish to host certain applications on different data centers than their competitors. In this case, a degradation in performance may affect competitors unequally, to the benefit of some competitors and to the detriment of other competitors. The spatial movement determination module 614 can take these considerations into account when deciding on when and where to migrate data components.

The above-enumerated factors are representative, rather than exhaustive. The spatial determination module 614 can take into consideration other factors, and any combination of various factors.

D. Illustrative Architectures of the Data Centers

The data center system 102 can provide data centers having hardware architectures which complement the use of renewable power sources, together with the general data-centric mode of operation of the data center system 102. As a general approach, the data center system 102 can eliminate or reduce the complexity of various components of each data center. The following list provides an illustrative and non-exhaustive summary of modifications that can be made to the data center system 102.

1) The data center system 102 can eliminate or reduce the use of uninterruptible power supply (UPS) technology and backup systems. In its place, the data center system 102 can use software-based solutions to address failures in the data centers.

2) The data center system 102 can eliminate or reduce redundancy in the power systems, such as redundant power cables, redundant power distribution units (PDUs), redundant breakers, and so on.

3) The data center system 102 can eliminate or reduce, where possible, the complexity of buildings that house its electrical and mechanical systems.

4) The data center system 102 can eliminate or reduce non-critical parts, such as sheet metal, housings, plastic cosmetic parts, etc. In addition, the data center system 102 can provide processor architectures having reduced cost and size. These provisions make it more cost effective to leave part of a data center idle when there are insufficient renewable power sources to power the data center.

Figure 13:
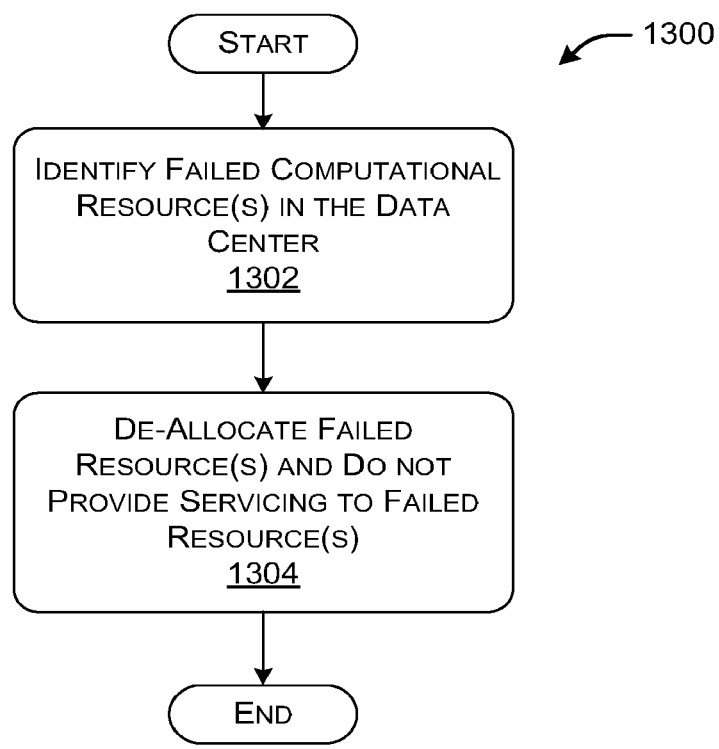
FIG. 13 is a flowchart that sets forth one manner in which the management system (of FIG. 6) can handle the failure of computational resources.

5) The data center system 102 can be managed such that failed components are left in place without servicing or replacement. FIG. 13 shows a procedure 1300 which summarizes this approach. In block 1302, the data center system 102 identifies a failed computational resource in a data center. In block 1304, the data center system 102 de-allocates the failed computational resource without servicing or replacing it.

6) The data center system 102 can eliminate or reduce many voltage transformation mechanisms, frequency synchronization mechanisms, and so on. For example, a solar powers source provides native DC power. Hence, this power source need not convert the energy it produces to AC form.

7) The data center system 102 can provide dual-use hardware. For example, the data center system 102 can use the hollow tower of a wind mill as a cooling tower for a data center that is co-located at the site of the wind mill. Further details on the integration of a wind mill and a data center are described in copending and commonly-assigned application Ser. No. 12/781,445, filed on May 17, 2010, naming the inventors of Douglas Burger, et al., entitled "Wind-Powered Data Center."

E. Representative Processing Functionality

FIG. 14 sets forth illustrative electrical data processing functionality 1400 that can be used to implement any aspect of the functions described above. With reference to FIG. 1, for instance, the type of processing functionality 1400 shown in FIG. 14 can be used to implement any aspect provided by any data center. For example, the processing functionality 1400 shown in FIG. 14 can be used to implement a server computer in a stack of server computers within a data center. Further, the type of processing functionality 1400 shown in FIG. 14 can be used to implement any aspect of the management system 120 (insofar as the management system 120 is implemented, at least in part, by a system that is separate from the data centers). In one case, the processing functionality 1400 may correspond to any type of computing device that includes one or more processing devices.

The processing functionality 1400 can include volatile and non-volatile memory, such as RAM 1402 and ROM 1404, as well as one or more processing devices 1406. The processing functionality 1400 also optionally includes various media devices 1408, such as a hard disk module, an optical disk module, and so forth. The processing functionality 1400 can perform various operations identified above when the processing device(s) 1406 executes instructions that are maintained by memory (e.g., RAM 1402, ROM 1404, or elsewhere). More generally, instructions and other information can be stored on any computer readable medium 1410, including, but not limited to, static memory storage devices, magnetic storage devices, optical storage devices, and so on. The term computer readable medium also encompasses plural storage devices.

The processing functionality 1400 also includes an input/output module 1412 for receiving various inputs from a user (via input mechanisms 1414), and for providing various outputs to the user (via output modules). One particular output mechanism may include a display mechanism 1416 and an associated graphical user interface (GUI) 1418. The processing functionality 1400 can also include one or more network interfaces 1420 for exchanging data with other devices via one or more communication conduits 1422. One or more communication buses 1424 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
one or more processing devices; and
a storage device storing computer readable instructions which, when executed by the one or more processing devices, cause the one or more processing devices to:
delay times at which data components associated with computational tasks are to be performed within data centers of a data center system, resulting in delayed data components;
monitor available power types at the data centers, the data centers being located at different locations supplied by different respective power resources; and
move the delayed data components to a new location in the data center system based at least in part on a type of available power at the new location.

2. The system of claim 1, wherein the type of available power at the new location is renewable energy.

3. The system of claim 1, wherein the computer readable instructions further cause the one or more processing devices to move the delayed data components based at least in part on cost of power at the data centers.

4. The system of claim 1, wherein the computer readable instructions further cause the one or more processing devices to delay the times based at least in part on ages of the data centers.

5. A system, comprising:

one or more processing devices; and a storage device storing computer readable instructions which, when executed by the one or more processing devices, cause the one or more processing devices to:

monitor different power resources available to data centers located at different respective data center locations;

determine power requirements for the data centers to process data components associated with a computational task;

identify an individual data component to move from a first data center to a second data center based at least in part on a first power requirement for the first data center to process the individual data component and first power resources available to the first data center; and select the second data center based at least in part on a second power requirement for the second data center to process the individual data component and second power resources available to the second data center.

6. The system of claim 5, wherein the computer readable instructions further cause the one or more processing devices to:

determine to move the individual data component based at least in part on a change in the first power resources.

7. The system of claim 5, wherein the computer readable instructions further cause the one or more processing devices to:

select the second data center based at least in part on a type of the second power resources available at the second data center.

8. The system of claim 7, wherein the type is renewable power and the second data center is selected over a third data center that lacks renewable power.

9. The system of claim 5, wherein the second power requirement is lower than the first power requirement.

10. The system of claim 9, wherein equipment at the second data center consumes less power to process the individual data component than other equipment at the first data center.

11. The system of claim 5, wherein the computer readable instructions further cause the one or more processing devices to:

repeatedly determine whether to move other individual data components from the first data center based at least in part on the first power resources available to the first data center.

12. The system of claim 5, wherein the computer readable instructions further cause the one or more processing devices to:

select the second data center based at least in part on a cost of moving the individual data component to the second data center.

13. The system of claim 5, wherein the data centers are part of a data center system, and the computer readable instructions further cause the one or more processing devices to:

determine to move the individual data component from the first data center to the second data center based at least in part on consideration of bandwidth resources of the second data center for communicating within the system.

14. A method, comprising:

monitoring performance of computational tasks at data centers in a data center system, the computational tasks comprising data components;

monitoring different types of power resources available to the data centers at different data center locations;

determining whether to move an individual data component from a first data center at a first data center location to a second data center at a second data center location;

in a first instance, moving the individual data component to the second data center based at least in part on a first type of the power resources available at the first data center location and a second type of the power resources available at the second data center location; and in a second instance, processing another individual data component at the first data center without moving the another individual data component to another data center based at least in part on predicted power availability at the another data center.

15. The method of claim 14, further comprising:

in the first instance, selecting the second data center based at least in part on a bandwidth cost of moving the individual data component to the second data center.

16. The method of claim 14, further comprising:

in the first instance, selecting the second data center based at least in part on latency-related costs of moving the individual data component to the second data center.

17. The method of claim 16, wherein the individual data component is a delayed computation component and the latency-related costs are associated with storing and retrieving the delayed computation component.

18. The method of claim 16, wherein the latency-related costs include an inventory-related cost of the individual data component becoming out-of-date.

19. The method of claim 14, further comprising:

in the first instance, moving the individual data component to the second data center based at least in part on power requirements of equipment at the first data center versus the second data center.

20. The method of claim 19, wherein the power requirements of the equipment at the first data center are higher than at the second data center.

* * * * *